US011276110B2

(12) United States Patent
Stewart et al.

(10) Patent No.: US 11,276,110 B2
(45) Date of Patent: *Mar. 15, 2022

(54) SALES MANAGEMENT AND VIDEO CHAT SYSTEM AND METHOD FOR A SALESPERSON MOBILE DEVICE AND A REMOTE VISITOR WEB BROWSER

(71) Applicant: DEALER INSIDE INC., Lakeside (CA)

(72) Inventors: Trevor Stewart, Lakeside (CA); Max Ladouceur, Granby (CA)

(73) Assignee: DEALER INSIDE INC., Lakeside (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/922,832

(22) Filed: Jul. 7, 2020

(65) Prior Publication Data

US 2020/0334742 A1    Oct. 22, 2020

Related U.S. Application Data

(63) Continuation-in-part of application No. 16/666,217, filed on Oct. 28, 2019, now Pat. No. 10,750,122.

(60) Provisional application No. 62/751,588, filed on Oct. 27, 2018.

(51) Int. Cl.
*G06Q 30/06* (2012.01)
*G06Q 30/02* (2012.01)
*H04N 7/14* (2006.01)

(52) U.S. Cl.
CPC ..... *G06Q 30/0643* (2013.01); *G06Q 30/0281* (2013.01); *G06Q 30/0617* (2013.01); *H04N 7/147* (2013.01); *G06Q 30/0611* (2013.01)

(58) Field of Classification Search
CPC ............ H04N 7/14; H04N 7/15; H04N 7/147; G06Q 30/06; G06Q 30/02; G06Q 30/0601
USPC ........... 348/14.01–14.16; 715/753; 705/26.1, 705/14.51, 27.1
See application file for complete search history.

(56) References Cited

U.S. PATENT DOCUMENTS

| 2001/0044751 | A1* | 11/2001 | Pugliese, III | G06Q 30/0643 705/14.1 |
| 2012/0158549 | A1* | 6/2012 | Dapoz | G06Q 30/0641 705/27.1 |
| 2013/0226683 | A1* | 8/2013 | Bement | G06Q 30/00 705/14.23 |
| 2014/0108288 | A1* | 4/2014 | Calman | G06Q 40/02 705/342 |

(Continued)

*Primary Examiner* — Melur Ramakrishnaiah
(74) *Attorney, Agent, or Firm* — Holbeche Law; Kevin Edward Holbeche

(57) ABSTRACT

Sales management and video chat systems and methods use website listings that correspond to vehicles for sale at a place of business. A remote visitor clicks a "live video" button beside a desired consumer good, and schedules a time for a video chat, using their web browser. A salesperson receives an alert, via a sales application running on on the salesperson's mobile device. At the scheduled time, a video chat window opens in the visitor's web browser with live audio/video of the desired consumer good from the place of business in real-time. The website visitor uses their web browser for live communication, in real-time, to the salesperson on their sales application. After the video chat, the website visitor can use their browser to download and save a recording of the video chat session.

20 Claims, 20 Drawing Sheets

(56) References Cited

U.S. PATENT DOCUMENTS

2014/0108557 A1\* 4/2014 Calman ................. G06Q 40/02
                                                    709/205
2018/0053253 A1\* 2/2018 Gokhale ............ G06Q 30/0239
2019/0043104 A1\* 2/2019 Bonnet ................ G06Q 20/405

\* cited by examiner

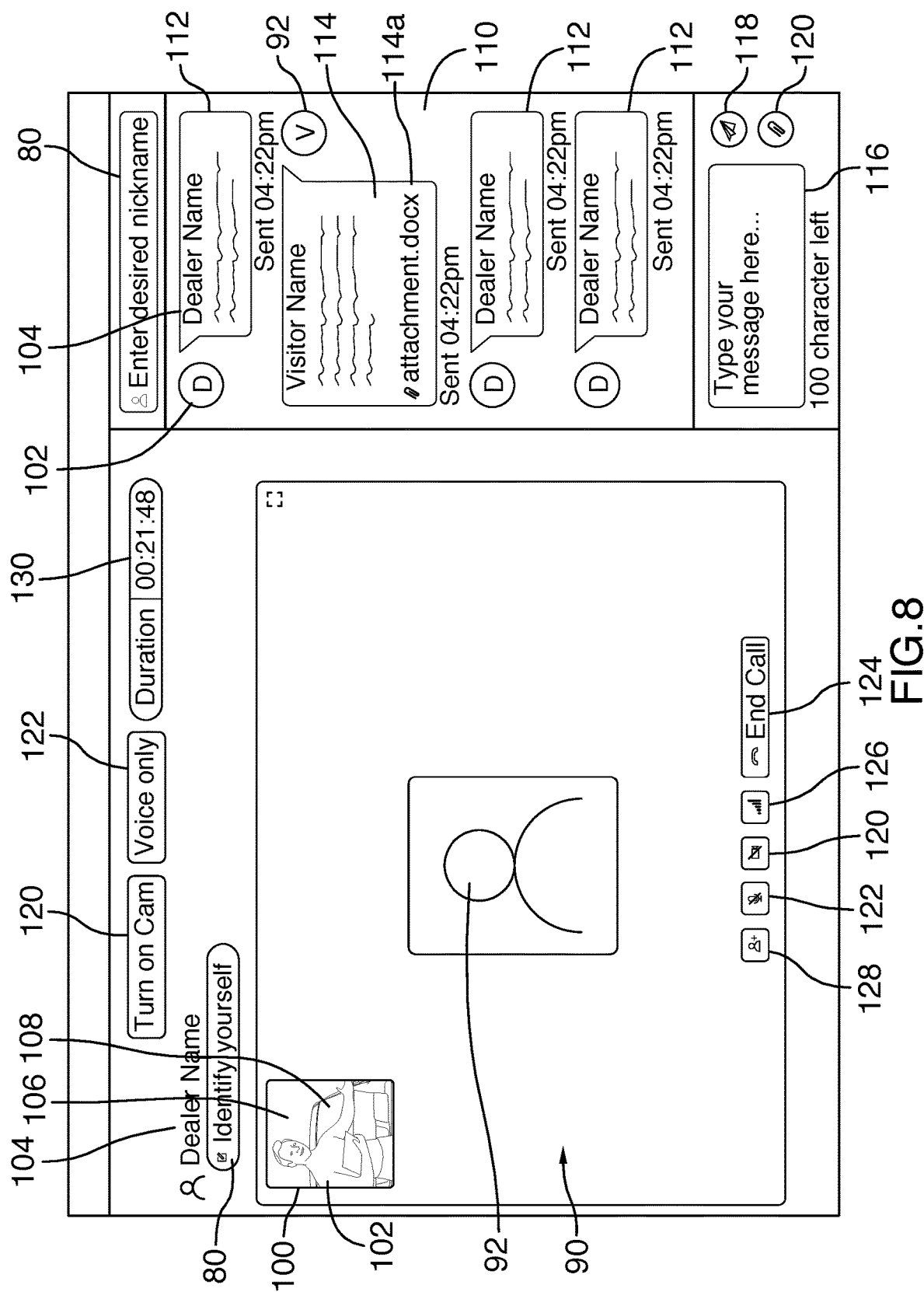

SALES MANAGEMENT AND VIDEO CHAT SYSTEM AND METHOD FOR A SALESPERSON MOBILE DEVICE AND A REMOTE VISITOR WEB BROWSER

FIELD OF THE INVENTION

The present invention relates generally to consumer good buying video communication and salesperson management and, more particularly, to a web-based vehicle buying video communication and salesperson management devices and bring-you-own-device ("BYOD") systems, methods, and computer readable media.

BACKGROUND OF THE INVENTION

Online vehicle dealership websites (alternately herein, "consumer goods business websites" or simply "business websites") may have included online shopping tools, and/or involved e-commerce, augmented reality ("AR"), virtual reality ("VR"), chatbots, and/or artificial intelligence ("AI") software applications, devices, and/or systems.

Some apps may have been intended to engage users and afford them with a more immediate and/or better understanding of how one or more vehicles (alternately herein, "cars" and/or "consumer goods") might appear in person. They may have featured three-dimensional ("3D") figures representing the vehicles, presenting a limited range of options via such apps.

The prior art may have suffered from a variety of shortcomings, potentially including an almost entirely digital and/or virtual (or otherwise deficient) user-facing experience. The prior art may have failed to provide a true and/or real dealership function and/or experience.

Prior art video conference software, systems, devices, and/or methods may have been used in the same general field as the invention, and/or in related fields. For example, in the prior art, people may have previously downloaded the Facebook Messenger and/or Skype software application ("app"), etc. to connect via video.

The prior art, however, may have failed to provide an online interface that allows communication, and preferably a video connection, directly over the world-wide web (the "web") and within a web browser window, without requiring download of Facebook Messenger, Skype, or any additional proprietary or other software, apps, and/or browser plug-ins. The prior art may have failed to provide an online interface that allows a fast web-based and relatively high resolution video connection and video communication.

Compared to the invention, previous solutions (i) may have been non-web-based, (ii) may have required download, installation and use of a separate proprietary or other app, and/or (iii) may have only afforded relatively low resolution video connection and communication.

What may be needed are web-based vehicle buying video communication and/or salesperson management devices and/or BYOD systems, methods, and/or computer readable media which afford potential customers with a real time dealership (alternately herein, "place of business") experience. It may be desirable and/or beneficial to innovatively merge certain aspects of dealership and online vehicle shopping.

It may be desirable and/or beneficial to improve users' experiences in shopping for vehicles.

The invention may desirably and/or advantageously improve, or help improve, the car buying experience—e.g., for customers, salespeople, and/or dealerships—preferably by allowing a website visitor to see one or more cars of potential interest in real time (or substantially in real time) without having to step foot in the dealership.

The invention may desirably and/or advantageously improve, or help improve, the car buying experience—e.g., for customers, salespeople, and/or dealerships—preferably by allowing a salesperson to show (with or without accompanying sound) one or more cars of interest to a potential customer, over the web, in real time (or substantially in real time) without requiring the customer to set foot in the dealership.

The invention may desirably and/or advantageously improve, or help improve, the car buying and/or selling experience—e.g., for customers, salespeople, and/or dealerships—preferably by effectively managing dealerships and/or salespeople on and via any devices, systems, methods, and/or computer readable media according to the invention.

The invention may desirably and/or advantageously improve, or help improve, the car buying and/or selling experience—e.g., for customers, salespeople, and/or dealerships—preferably by allowing salespeople to communicate by video with potential customers on and via salespeople's "bring-your-own-device" ("BYOD") devices utilizing systems, methods, and/or computer readable media according to the invention.

It may be an object according to one aspect of the invention to provide a web-based vehicle buying video communication and/or salesperson management device and/or BYOD system, method and/or computer readable medium.

It may be an object according to one aspect of the invention to provide web-based vehicle buying video communication and/or salesperson management devices and/or BYOD systems, methods, and/or computer readable media which may help users find, select, and/or buy particular vehicles that work for each of them individually and/or personally.

It is an object of the present invention to obviate or mitigate one or more disadvantages and/or shortcomings associated with the prior art, to meet or provide for one or more desires, benefits, needs and/or advantages, and/or to achieve one or more objects of the invention—one or more of which may preferably be readily appreciable by and/or suggested to those skilled in the art in view of the teachings and/or disclosures hereof.

SUMMARY OF THE INVENTION

According to the invention, there are disclosed one or more web-based vehicle buying video communication and/or dealership salesperson management devices and/or BYOD systems, methods, and/or computer readable media.

According to one aspect of the invention, the devices, systems, methods, and/or computer readable media may preferably, but need not necessarily, require no sign-in or download. Preferably, a user may just answer and/or connect with the app according to the invention. Preferably, the invention may improve, and/or help improve, the lead-generation and/or customer relationship management ("CRM") process via a two-way conversation. Preferably, use of the device, system, method and/or computer readable medium according to the invention may be superior to merely communicating via email.

According to the invention, there may be provided a web-based vehicle buying video communication and/or dealership salesperson management device and/or BYOD system, method and/or computer readable medium, which affords one or more CRM and/or dealership management and/or workflow features.

According to the invention, there is also disclosed a vehicle (alternately herein, "consumer goods") sales management and video chat system. The system may be for use with a salesperson's networking electronic device which may be local to a salesperson at a dealership (alternately herein, "place of business") and/or with a standard web browsing application running on a visitor's networking electronic device that may be local to a website visitor who may be remote from the dealership. The system may include at least one desired vehicle (alternately herein, "desired consumer good") that may be physically located onsite at the dealership and available for potential acquisition by the website visitor. The system may also include a dealership website (alternately herein, "business website") that may be remote from and presented to the website visitor via the standard web browsing application. The system may also include listings on the dealership website that may include at least one available vehicle listing (alternately herein, "available consumer good listing") which corresponds to the desired vehicle. The system may also include a live video button, substantially adjacent to the available vehicle listing on the dealership website, that may be selectively engageable by the website visitor. The system may also include a scheduling window that may be presented to the website visitor, via the standard web browsing application, after the website visitor has selectively engaged the live video button. The scheduling window may enable the website visitor to select a predetermined video chat time. The system may also include a dedicated vehicle sales application (alternately herein, "consumer goods sales application") running on the salesperson's networking electronic device. The system may also include an alert notification that may be presented to the salesperson, via the dedicated vehicle sales application, after the website visitor has selected the predetermined video chat time. The system may also include a visitor video chat window that, starting substantially at the predetermined video chat time, may present live audio and video from the dealership, via the dedicated vehicle sales application running on the salesperson's networking electronic device, substantially in real-time, to the website visitor via the standard web browsing application. The live audio and video from the dealership may include live audio and video of the desired vehicle. The system may also include a salesperson video chat window that, starting substantially at the predetermined video chat time, may present live communication from the website visitor, via the standard web browsing application, substantially in real-time, to the salesperson via the dedicated vehicle sales application. The system may also include a dealership storage subsystem (alternately herein, "business storage subsystem") that may be remote from the website visitor. The system may also include a session recording of the live audio and video from the dealership and the communication from the website visitor. The session recording may be securely stored by the dealership storage subsystem. The system may also include a hang-up button that may be presented to the website visitor via the standard web browsing application and to the salesperson via the dedicated vehicle sales application. The hang-up button may be selectively engageable to close the visitor video chat window and the salesperson video chat window. The system may also include a video download window that may be presented to the website visitor, via the standard web browsing application, after selective engagement of the hang-up button. The video download window may enable the website visitor to selectively download and store a copy of the session recording to the visitor's networking electronic device.

According to one aspect of the invention, the system may preferably, but need not necessarily, also include one or more communication buttons that are presented via the standard web browsing application. The communication buttons may preferably, but need not necessarily, be selectively engageable by the website visitor to present, as said live communication, one or more of the following inputs as received by the visitor's networking electronic device: text only; voice only; and/or voice and video together.

According to one aspect of the invention, the system may preferably, but need not necessarily, be further adapted for use by other dealership personnel (alternately herein, "other business personnel") at the dealership and at other business places. The system may preferably, but need not necessarily, include a call transfer button that may preferably, but need not necessarily, be presented to the website visitor via the standard web browsing application and to the salesperson via the dedicated vehicle sales application. The call transfer button may preferably, but need not necessarily, be selectively engageable to transfer the salesperson video chat window to an appropriate one of the other dealership personnel based on at least one of: the live audio and video from the dealership; the desired vehicle; and/or the live communication from the website visitor.

According to one aspect of the invention, preferably when the website visitor has a potential trade-in vehicle (alternately herein, "trade-in consumer good") for appraisal as part of the potential acquisition of the desired vehicle, the appropriate one of the other dealership personnel may preferably, but need not necessarily, be a vehicle appraiser (alternately herein, "consumer goods appraiser").

According to one aspect of the invention, the scheduling window may preferably, but need not necessarily, enable selection of the predetermined video chat time from among one or more preset options.

According to one aspect of the invention, the system may preferably, but need not necessarily, also include a timer window. The timer window may preferably, but need not necessarily, be presented via the standard web browsing application after the website visitor has selected the predetermined video chat time. The timer window may preferably, but need not necessarily, count-down any time remaining until the predetermined video chat time. The system may preferably, but need not necessarily, enable the website visitor to continue otherwise using the standard web browsing application until the predetermined video chat time.

According to one aspect of the invention, the alert notification may preferably, but need not necessarily, prompt the salesperson to prepare, before expiry of any time remaining until the predetermined video chat time, a live presentation of the desired vehicle for the website visitor.

According to one aspect of the invention, the video download window may preferably, but need not necessarily, require entry of a personal name and an email address/SMS number for the website visitor before delivering a download link to the email address/SMS number. The download link may preferably, but need not necessarily, enable the website visitor to, as aforesaid, selectively download and store a copy of the session recording to the visitor's networking electronic device. The dealership storage subsystem may preferably, but need not necessarily, store the personal name and the email address/SMS number. The dealership storage subsystem may preferably, but need not necessarily, provide the personal name and the email address/SMS number to the salesperson and/or the dealership.

According to one aspect of the invention, the system may preferably, but need not necessarily, also include a feedback prompt. The feedback prompt may preferably, but need not necessarily, be presented to the website visitor, via the standard web browsing application, after the video download window. The feedback prompt may preferably, but need not necessarily, enable the website visitor to share feedback concerning the live audio and video for access by the dealership and/or potentially via social media for third party access.

According to one aspect of the invention, the system may preferably, but need not necessarily, also include a dealership prompt (alternately herein, "business prompt"). The dealership prompt may preferably, but need not necessarily, be presented to the website visitor, via the standard web browsing application, after the video download window. The dealership prompt may preferably, but need not necessarily, enable the website visitor to schedule an in-person meeting with the salesperson for a test drive, to see the consumer good in-person, and/or to advance the potential acquisition of the desired vehicle by the website visitor.

According to one aspect of the invention, the system may preferably, but need not necessarily, also include a trade-in prompt. The trade-in prompt may preferably, but need not necessarily, be presented to the website visitor, via the standard web browsing application, after the video download window. The trade-in prompt may preferably, but need not necessarily, enable the website visitor to schedule a video chat with the dealership for appraisal of a potential trade-in vehicle as part of the potential acquisition of the desired vehicle.

According to one aspect of the invention, the system may preferably, but need not necessarily, be further adapted for use by a number of other salespeople at the dealership and at other business places and/or for use with a current volume of website traffic. The system may preferably, but need not necessarily, also include a log-in window. The log-in window may preferably, but need not necessarily, enable the salesperson to log-in to the dedicated vehicle sales application after arriving at the dealership. The system may preferably, but need not necessarily, also include a dealership queue (alternately herein, "business queue") of the other salespeople at the dealership and at other business places who have logged-in to the dedicated vehicle sales application. The dealership queue may preferably, but need not necessarily, be stored in the dealership storage subsystem. The system may preferably, but need not necessarily, include a dealership processor (alternately herein, "business processor"). The dealership processor may preferably, but need not necessarily, calculate a position of the salesperson in the dealership queue, preferably based on when the salesperson logged-in to the dedicated vehicle sales application. The dealership processor may preferably, but need not necessarily, calculate—based on the position of the salesperson in the dealership queue and/or on the current volume of website traffic—an estimated time until the salesperson may preferably, but need not necessarily, be presented with the alert notification as aforesaid. The system may preferably, but need not necessarily, include a time estimate notification. The time estimate notification may preferably, but need not necessarily, be presented to the salesperson, via the dedicated vehicle sales application, after the salesperson has logged-in as aforesaid. The time estimate notification may preferably, but need not necessarily, include the estimated time and/or the position of the salesperson in the dealership queue.

According to one aspect of the invention, preferably after the alert notification may be presented to the salesperson, the dealership processor may preferably, but need not necessarily, calculate: updated positions of the other salespeople in the dealership queue; and/or new estimated times. The new estimated times may preferably, but need not necessarily, be based on the updated positions of the other salespeople in the dealership queue and/or on the current volume of website traffic. The dedicated vehicle sales application may preferably, but need not necessarily, present the new estimated times to the other salespeople in the dealership queue.

According to one aspect of the invention, the system may preferably, but need not necessarily, also include a dealership administrator interface (alternately herein, "business administrator interface"). The dealership administrator interface may preferably, but need not necessarily, enable the dealership to monitor, review, and/or manage substantially all information and/or activity related to the dealership website, the website visitor, the listings on the dealership website, the available vehicle listing, the dedicated vehicle sales application, the salesperson, the live audio and video from the dealership, the live communication from the website visitor, the dealership storage subsystem, and/or the session recording, for quality control and/or training purposes.

According to the invention, there is also disclosed a method of vehicle (alternately herein, "consumer goods") sales management and video chat. The method may be for use with a salesperson's networking electronic device that may be local to a salesperson at a dealership (alternately herein, "place of business") and/or with a standard web browsing application running on a visitor's networking electronic device that may be local to a website visitor who may be remote from the dealership. The method may include a listing step of using the standard web browsing application, running on the networking electronic device that may be local to the website visitor, to present: (a) at least one available vehicle listing (alternately herein, "available consumer good listing") among listings on a dealership website (alternately herein, "business website"); and/or (b) a live video button. The available vehicle listing may correspond to a desired vehicle (alternately herein, "desired consumer good") that may be physically located onsite at the dealership and/or available for potential acquisition by the website visitor. The live video button may be substantially adjacent to the available vehicle listing on the dealership website. The live video button may be selectively engageable by the website visitor. The method may also include a scheduling step of presenting a scheduling window to the website visitor, via the standard web browsing application, after the website visitor has selectively engaged the live video button. The scheduling window may enable the website visitor to select a predetermined video chat time. The method may also include a vehicle sales application providing step (alternately herein, "consumer goods sales application providing step") of providing a dedicated vehicle sales application (alternately herein, "consumer goods sales application") running on the salesperson's networking electronic device. The method may also include an alert step of presenting an alert notification to the salesperson, via the dedicated vehicle sales application, after the website visitor has selected the predetermined video chat time. The method may also include a video chat step of providing: (i) a visitor video chat window; and (ii) a salesperson video chat window. The visitor video chat window may, starting substantially at the predetermined video chat time, present live audio and video from the dealership, via the dedicated vehicle sales application running on the salesperson's networking electronic device, substantially in real-time, to the website visitor via the standard web browsing application. The live audio and video from the dealership may include live audio and video of the desired vehicle. The salesperson video chat window may, starting substantially at the predetermined video chat time, present live communication from the website visitor, via the standard web browsing application, substantially in real-time, to the salesperson via the dedicated vehicle sales application. The method may also include a dealership storage step (alternately herein, "business storage step") of providing a dealership storage subsystem (alternately herein, "business storage subsystem") that may be remote from the website visitor. The method may also include a session recording step of providing a session recording of the live audio and video from the dealership and/or the communication from the website visitor. The session recording may be securely stored by the dealership storage subsystem. The method may also include a hang-up step of providing a hang-up button that may be presented to the website visitor via the standard web browsing application and/or to the salesperson via the dedicated vehicle sales application. The hang-up button may be selectively engageable to close the visitor video chat window and/or the salesperson video chat window. The method may also include a video download step of providing a video download window that may be presented to the website visitor, via the standard web browsing application, after selective engagement of the hang-up button. The video download window may enable the website visitor to selectively download and/or store a copy of the session recording to the visitor's networking electronic device.

According to one aspect of the invention, the method may preferably, but need not necessarily, include a communication step of providing one or more communication buttons. The communication buttons may preferably, but need not necessarily, be presented via the standard web browsing application. The communication buttons may preferably, but need not necessarily, be selectively engageable by the website visitor to present, as said live communication, one or more of the following inputs as received by the visitor's networking electronic device: text only; voice only; and/or voice and video together.

According to one aspect of the invention, the method may preferably, but need not necessarily, be further adapted for use by other dealership personnel (alternately herein, "other business personnel") at the dealership and at other business places. The method may preferably, but need not necessarily, include a call transfer step of providing a call transfer button. The call transfer button may preferably, but need not necessarily, be presented to the website visitor via the standard web browsing application and/or to the salesperson via the dedicated vehicle sales application. The call transfer button may preferably, but need not necessarily, be selectively engageable to transfer the salesperson video chat window to an appropriate one of the other dealership personnel, preferably based on at least one of: the live audio and video from the dealership; the desired vehicle; and/or the live communication from the website visitor.

According to one aspect of the invention, preferably in the call transfer step, preferably when the website visitor has a potential trade-in vehicle (alternately herein, "potential trade-in consumer good") for appraisal as part of the potential acquisition of the desired vehicle, the appropriate one of the other dealership personnel may preferably, but need not necessarily, be a vehicle appraiser.

According to one aspect of the invention, preferably in the scheduling step, the scheduling window may preferably, but need not necessarily, enable selection of the predetermined video chat time from among one or more preset options.

According to one aspect of the invention, the method may preferably, but need not necessarily, also include a timer step of providing a timer window. The timer window may preferably, but need not necessarily, be presented via the standard web browsing application after the website visitor has selected the predetermined video chat time. The timer window may preferably, but need not necessarily, countdown any time remaining until the predetermined video chat time. Preferably during the timer step, the dealer website may preferably, but need not necessarily, enable the website visitor to continue otherwise using the standard web browsing application, preferably until the predetermined video chat time.

According to one aspect of the invention, preferably in the alert step, the alert notification may preferably, but need not necessarily, prompt the salesperson to prepare, preferably before expiry of any time remaining until the predetermined video chat time, a live presentation of the desired vehicle for the website visitor.

According to one aspect of the invention, preferably in the video download step, the video download window may preferably, but need not necessarily, require entry of a personal name and/or an email address/SMS number for the website visitor before delivering, to the email address/SMS number, a download link. The download link may preferably, but need not necessarily, enable the website visitor to, as aforesaid, selectively download and/or store a copy of the session recording to the visitor's networking electronic device. Preferably in the dealership storage step, the dealership storage subsystem may preferably, but need not necessarily, store the personal name and/or the email address/SMS number. Preferably in the dealership storage step, the dealership storage subsystem may preferably, but need not necessarily, provide the personal name and/or the email address/SMS number to the salesperson and/or the dealership.

According to one aspect of the invention, the method may preferably, but need not necessarily, include a feedback step of providing a feedback prompt. The feedback prompt may preferably, but need not necessarily, be presented to the website visitor, via the standard web browsing application, after the video download window. The feedback prompt may preferably, but need not necessarily, enable the website visitor to share feedback concerning the live audio and video for access by the dealership and/or potentially via social media for third party access.

According to one aspect of the invention, the method may preferably, but need not necessarily, include a dealership step of providing a dealership prompt (alternately herein, "business prompt"). The dealership prompt may preferably, but need not necessarily, be presented to the website visitor, via the standard web browsing application, after the video download window. The dealership prompt may preferably, but need not necessarily, enable the website visitor to schedule an in-person meeting with the salesperson for a test drive, to see the consumer good in-person, and/or to advance the potential acquisition of the desired vehicle by the website visitor.

According to one aspect of the invention, the method may preferably, but need not necessarily, include a trade-in step of providing a trade-in prompt. The trade-in prompt may preferably, but need not necessarily, be presented to the website visitor, via the standard web browsing application, after the video download window. The trade-in prompt may preferably, but need not necessarily, enable the website visitor to schedule a video chat with the dealership for appraisal of a potential trade-in vehicle as part of the potential acquisition of the desired vehicle.

According to one aspect of the invention, the method may preferably, but need not necessarily, be further adapted for use by a number of other salespeople at the dealership and at other business places and/or for use with a current volume of website traffic. The method may preferably, but need not necessarily, include a log-in step, a dealership queuing step (alternately herein, "business queuing step"), a dealership processing step (alternately herein, "business processing step"), and/or a time estimate notification step. Preferably in the log-in step, a log-in window may preferably, but need not necessarily, be provided that enables the salesperson to log-in to the dedicated vehicle sales application after arriving at the dealership. Preferably in the dealership queuing step, a dealership queue (alternately herein, "business queue") may preferably, but need not necessarily, be provided of the other salespeople at the dealership and at any said other business places who have logged-in to the dedicated vehicle sales application. The dealership queue may preferably, but need not necessarily, be stored in the dealership storage subsystem. Preferably in the dealership processing step, a dealership processor (alternately herein, "business processor") may preferably, but need not necessarily, be used to calculate a position of the salesperson in the dealership queue, preferably based on when the salesperson logged-in to the dedicated vehicle sales application. Preferably in the dealership processing step, the dealership processor may preferably, but need not necessarily, be used to calculate, based on the position of the salesperson in the dealership queue and on the current volume of website traffic, an estimated time until the salesperson may preferably, but need not necessarily, be presented with the alert notification as aforesaid. Preferably in the time estimate notification step, a time estimate notification may preferably, but need not necessarily, be presented to the salesperson, via the dedicated vehicle sales application, after the salesperson has logged-in as aforesaid. The time estimate notification may preferably, but need not necessarily, include the estimated time and/or the position of the salesperson in the dealership queue.

According to one aspect of the invention, preferably in the dealership processing step, and preferably after the alert notification has been presented to the salesperson, the dealership processor may preferably, but need not necessarily, calculate: updated positions of the other salespeople in the dealership queue; and/or new estimated times preferably based on the updated positions of the other salespeople in the dealership queue and/or on the current volume of website traffic. The dedicated vehicle sales application may preferably, but need not necessarily, present the new estimated times to the other salespeople in the dealership queue.

According to one aspect of the invention, the method may preferably, but need not necessarily, include a dealership administration step (alternately herein, "business administration step") of providing a dealership administrator interface (alternately herein, "business administrator interface"). The dealership administrator interface may preferably, but need not necessarily, enable the dealership to monitor, review, and/or manage substantially all information and/or activity related to the dealership website, the website visitor, the listings on the dealership website, the available vehicle listing, the dedicated vehicle sales application, the salesperson, the live audio and video from the dealership, the live communication from the website visitor, the dealership storage subsystem, and/or the session recording, for quality control and/or training purposes.

Persons skilled in the art will appreciate in view of the teachings and disclosures herein that the web-based vehicle buying video communication and/or dealership salesperson management devices and/or BYOD systems, methods, and/or computer readable media according to the invention offer significant advantageous utilities and/or functionality in comparison to the prior art.

Other advantages, features and characteristics of the present invention, as well as methods of operation and functions of the related elements of the structure, and the combination of parts and economies of manufacture, will become more apparent upon consideration of the following detailed description with reference to the accompanying figures, the latter of which are briefly described hereinbelow.

BRIEF DESCRIPTION OF THE DRAWINGS

The novel features which are believed to be characteristic of the device, system, method, and computer readable medium according to the present invention, as to their structure, organization, use and method of operation, together with further objectives and advantages thereof, will be better understood from the following figures in which presently preferred embodiments of the invention will now be illustrated by way of example. It is expressly understood, however, that the figures are for the purpose of illustration and description only, and are not intended as a definition of the limits of the invention. In the accompanying figures:

FIG. 8 is a salesperson video chat window of the system of FIG. 1, showing a dedicated vehicle sales application thereof, and shown on a salesperson's networking electronic device;

DETAILED DESCRIPTION OF PREFERRED EMBODIMENTS

This disclosure, including the accompanying drawings, may include one or more numbers, words, phrases, sentences, menu items, arrangements, and/or configurations which may be included by way of example. It may bear repeating, in this respect specifically, that such drawings and/or this disclosure are for the purpose of illustration and description only, and not intended as a definition of the limits of the invention.

The accompanying drawings illustrate aspects of one or more web-based vehicle buying video communication and/or dealership salesperson management devices and/or BYOD systems, methods, and computer readable media according to preferred embodiments of the invention.

Figure 1:
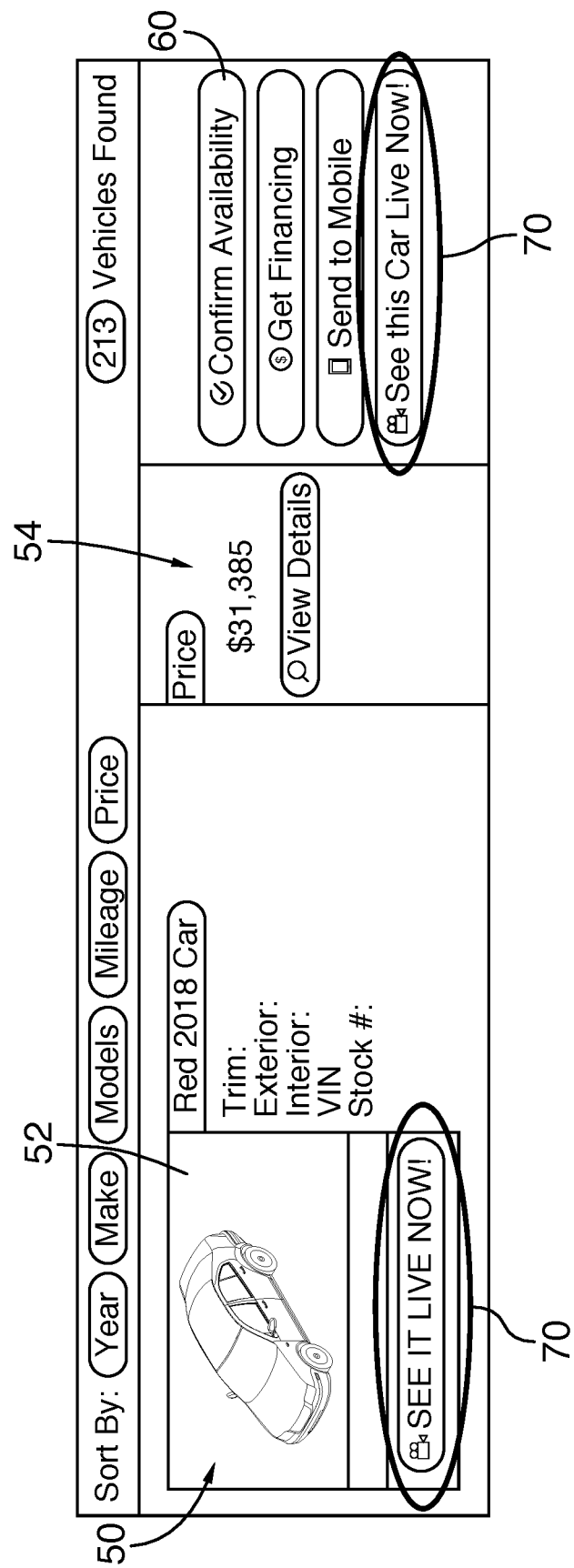
FIG. 1 is an available vehicle listing presented on a dealership website in a vehicle sales management and video chat system according to a preferred embodiment of the invention, showing a vehicle and a live video button thereof, and shown on a standard web browsing application.
Figure 2:
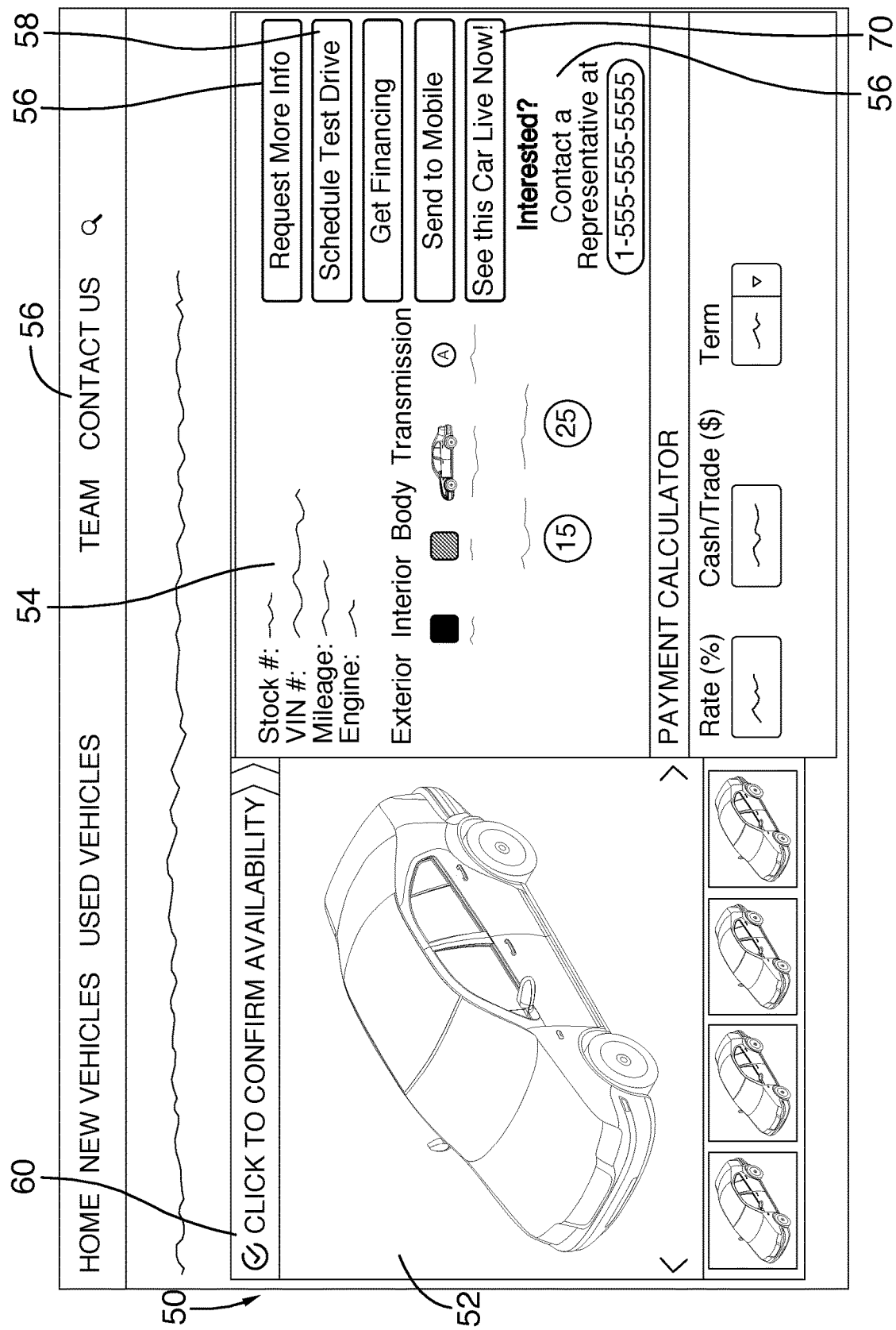
FIG. 2 is another available vehicle listing of the system of FIG. 1.
Figure 3:
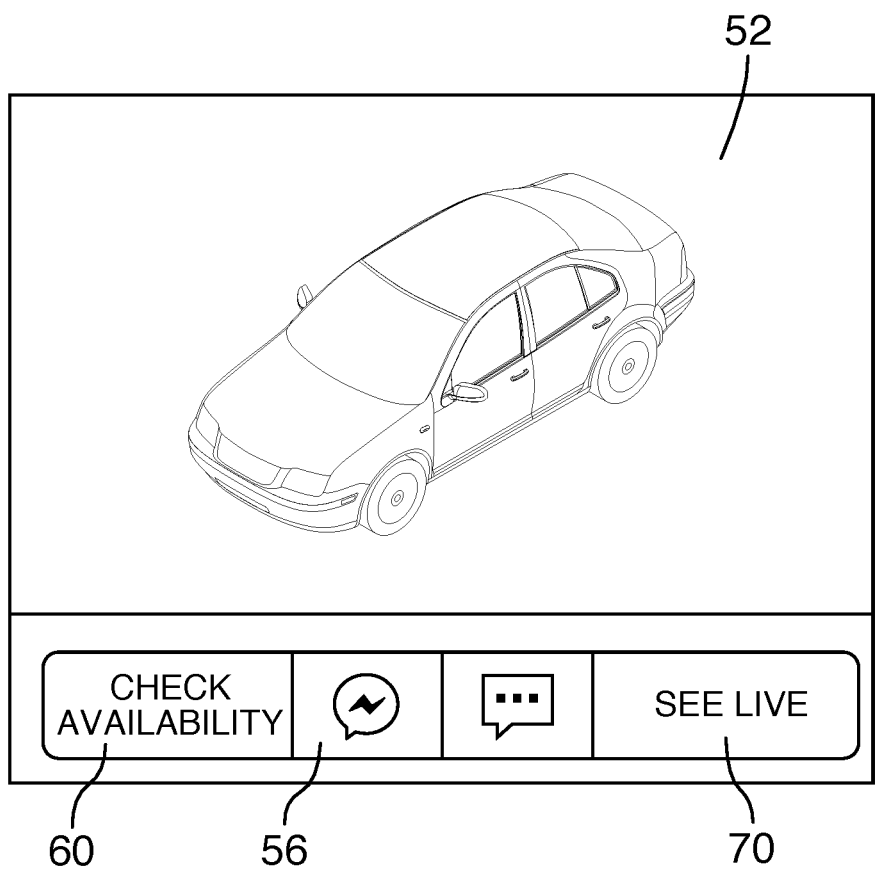
FIG. 3 is yet another available vehicle listing of the system of FIG. 1.
Figure 4:
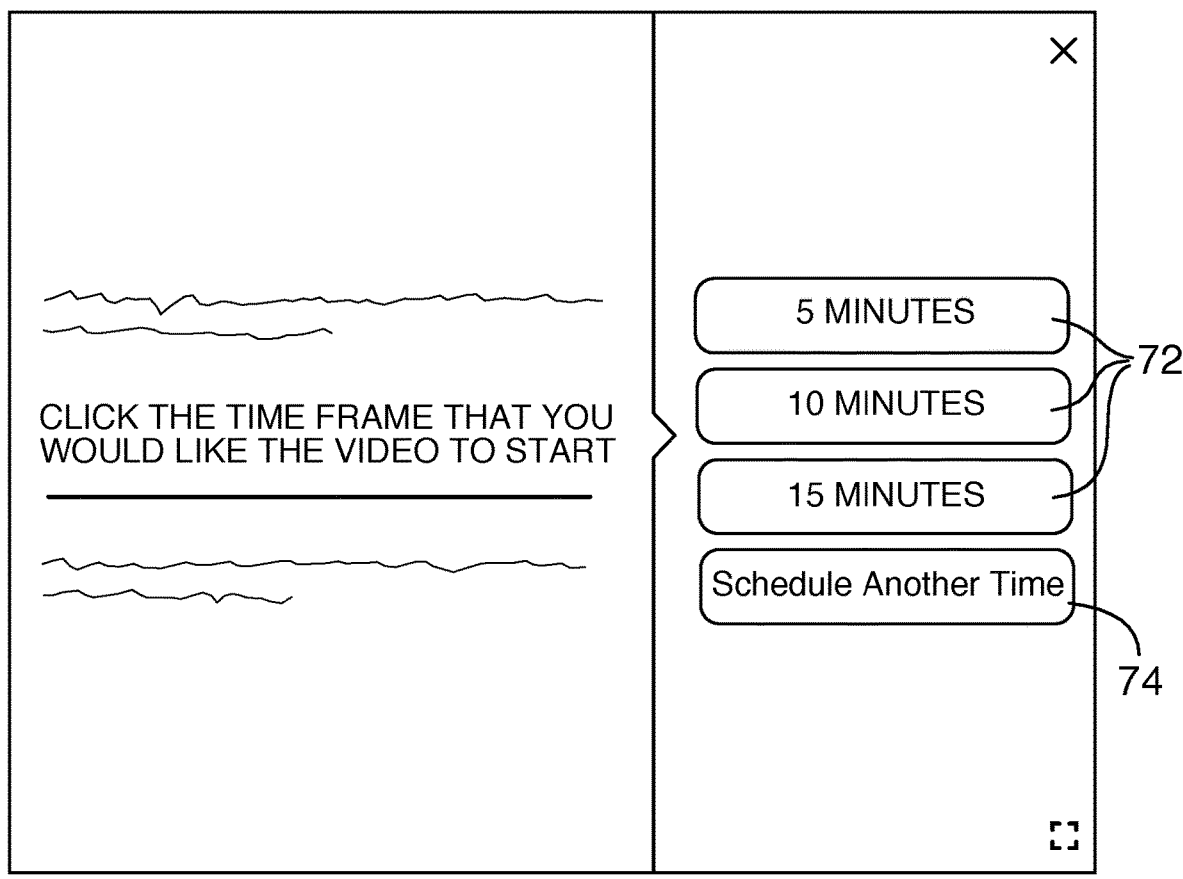
FIG. 4 is a scheduling window of the system of FIG. 1, showing present options for a predetermined video chat time thereof.
Figure 5:
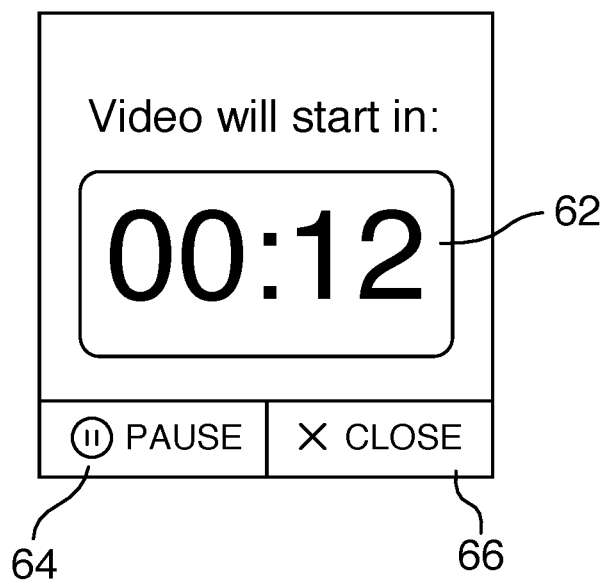
FIG. 5 is a timer window and an alert notification of the system of FIG. 1.

A vehicle sales management and video chat system according to a preferred embodiment of the invention is shown in FIGS. 1 to 19. Among other things, the system includes a dealership website (as best seen in FIGS. 1 to 4, FIGS. 6 to 7B, and FIGS. 9 to 12), available vehicle listings (as shown in FIGS. 1 to 3), a scheduling window (as shown in FIG. 4), a floating countdown timer and alert notification (as shown in FIG. 5), a dedicated vehicle sales application (as shown in FIG. 8), video download window as shown in FIG. 10, a log-in window (as shown in FIG. 13), a dealership administrator interface (as shown in FIGS. 14 to 19), and dealership storage subsystem (as shown in FIGS. 14 to 16 and FIG. 18). The system is for use with, among other things, a standard web browsing application (as best seen in FIGS. 1 to 4, FIGS. 6 to 7B, and FIGS. 9 to 12) running on a visitor's networking electronic device (as shown in FIG. 7A) and with salesperson's networking electronic device (as shown in FIG. 8).

In use, a video chat application 90, 100, 110 provided according to the invention preferably allows a visitor 92 to actually view any particular vehicle 108 they might like to see on the dealer's website. The app may house the one and only technology which may be web-based meaning, e.g., no sign-in or download may be required of the user.

Preferably, while a website visitor 92 simply browses vehicle listings 50 from a dealer's site, the invention may integrate one or more call-to-actions 70 that may start an app, provided according to the invention, directly on the dealer's website.

See, for example, the "See Live", "See It Live Now!" and/or "See the Car Live Now!" clickable buttons 70 in accompanying FIGS. 1 to 3 according to the invention.

Preferably, after a user clicks on any of the "see car live" buttons 70 they may be presented with a pop-up window (for example, as shown in FIG. 4) according to the invention.

Figure 6:
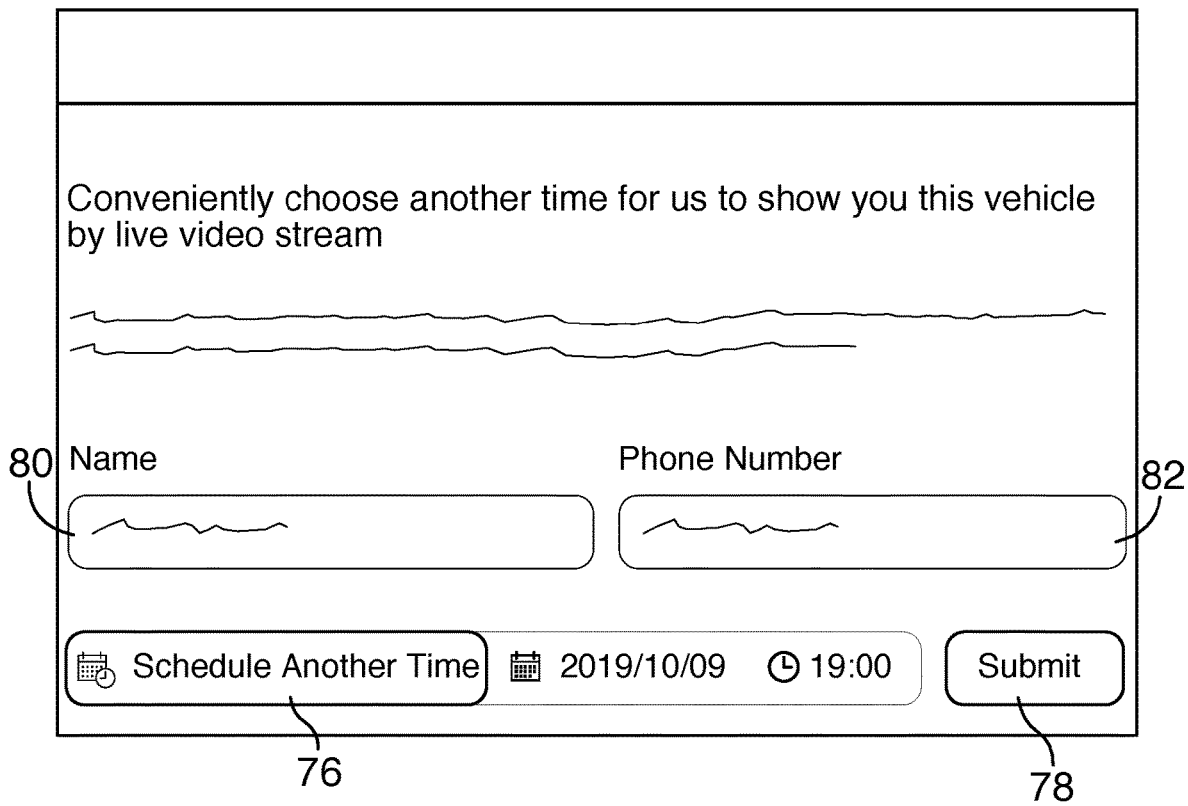
FIG. 6 is another scheduling window of the system of FIG. 1, showing website visitor personal name and SMS number entries thereof.
Figure 7A:
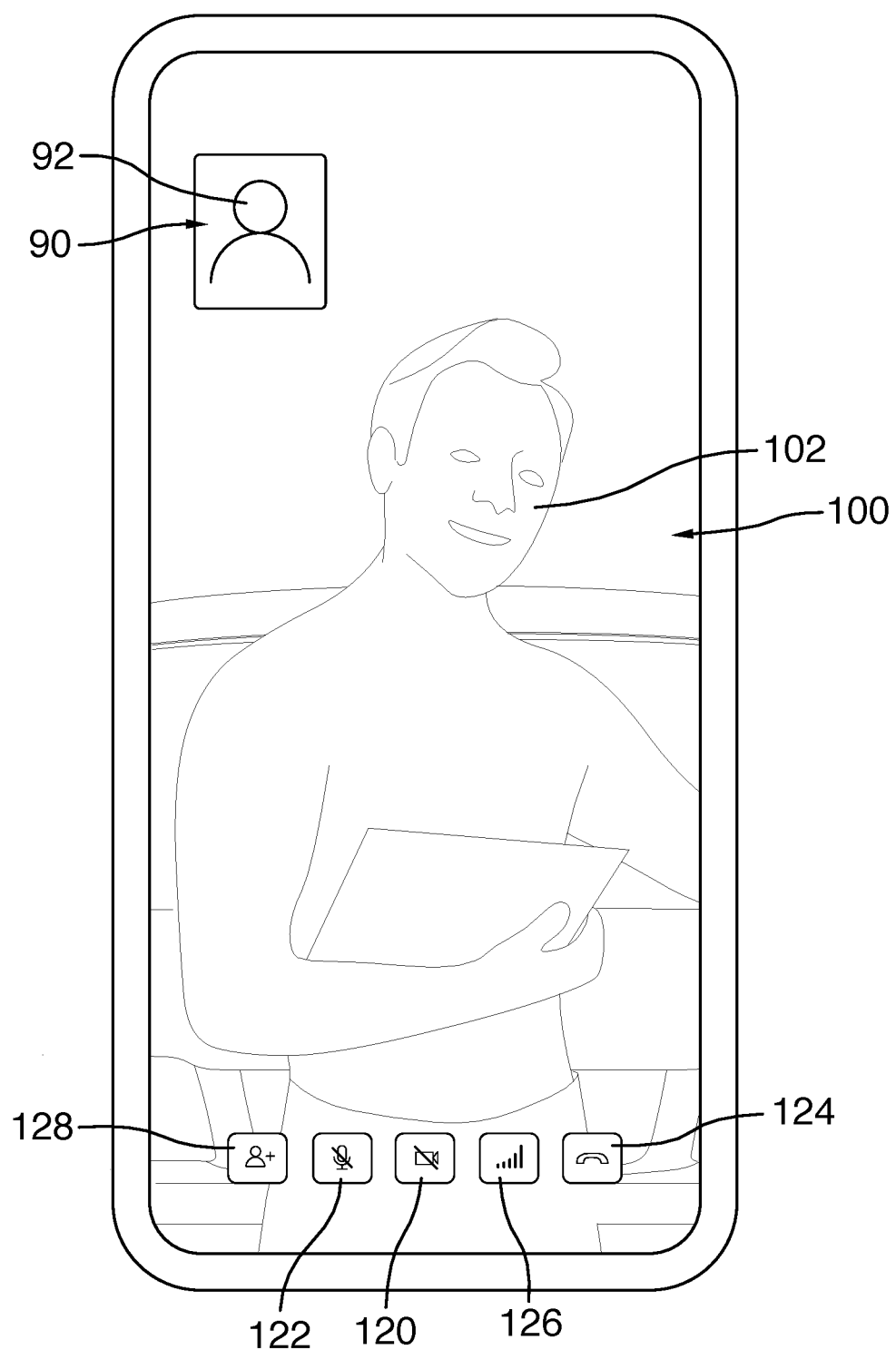
FIG. 7A is a visitor video chat window of the system of FIG. 1, showing a call transfer button, communication buttons, a hang-up button, and live audio and video of a vehicle thereof, and shown with a salesperson at a dealership and an anonymous representation of a website visitor on a visitor's networking electronic device.

Preferably, such pop-up window may afford the user an opportunity to select a desired time from one or more (e.g., three) options 72, 72, 72 proposed according to the invention, or to schedule one or more custom dates/times 74 from a calendar 76 (for example, as shown in FIG. 6). The predetermined video chat time and one of the preset options 72 and/or custom dates/times 74 may be substantially immediate or "Now" (not shown).

Preferably, after choosing a time frame 72, 74 for a video conference with a vehicle dealership salesperson, the potential customer may continue to browse the dealership website. Preferably, a floating timer 62 may then be presented to the potential customer 92, according to the invention. The floating timer 62 may preferably show a countdown 62 until arrival of the predetermined time for the vehicle dealership salesperson video conference. For example, see the timer shown in FIG. 5 according to the invention.

Figure 7B:
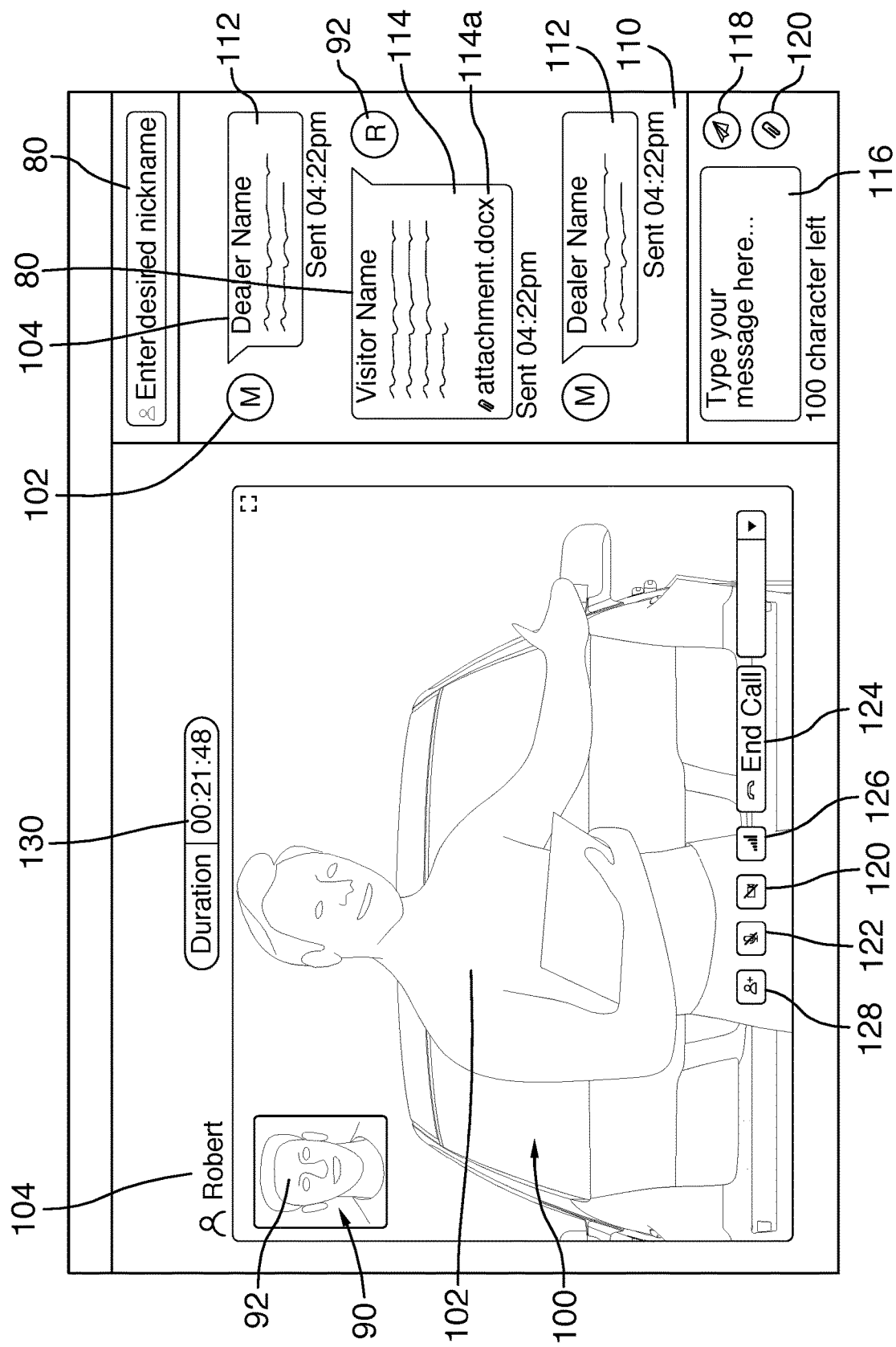
FIG. 7B is another visitor video chat window of the system of FIG. 1, showing website visitor live communication thereof, and shown with the website visitor on another visitor's networking electronic device.

Preferably, after the timer 62 reaches an end of the countdown, a potential customer will be presented with a chat page (as shown in FIGS. 7A, 7Bm and 9), and connected live with a dealership salesperson 102 standing adjacent a customer preselected vehicle 108 of potential interest, according to the invention.

Figure 9:
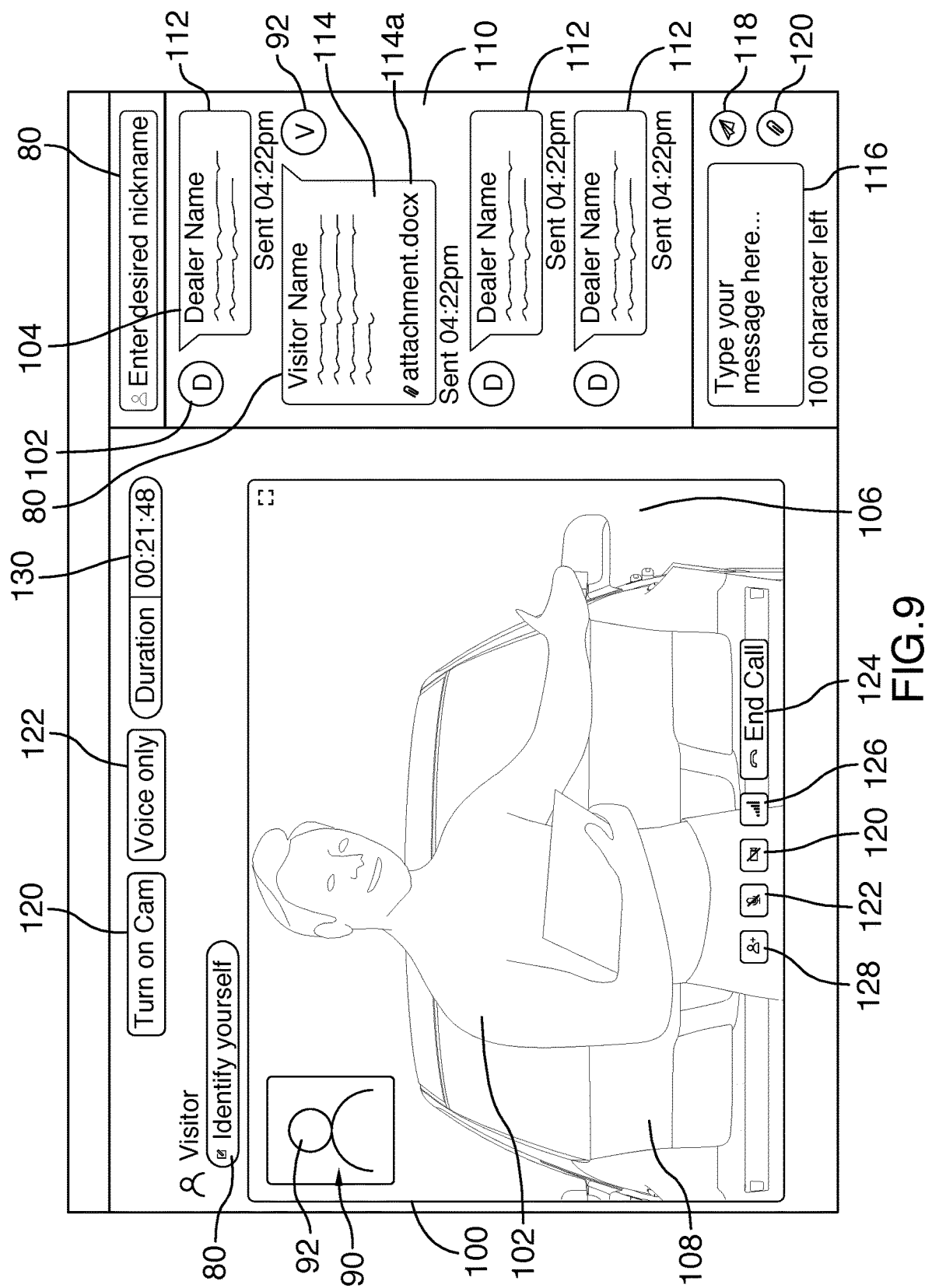
FIG. 9 is another visitor video chat window of the system of FIG. 1.
Figure 10:
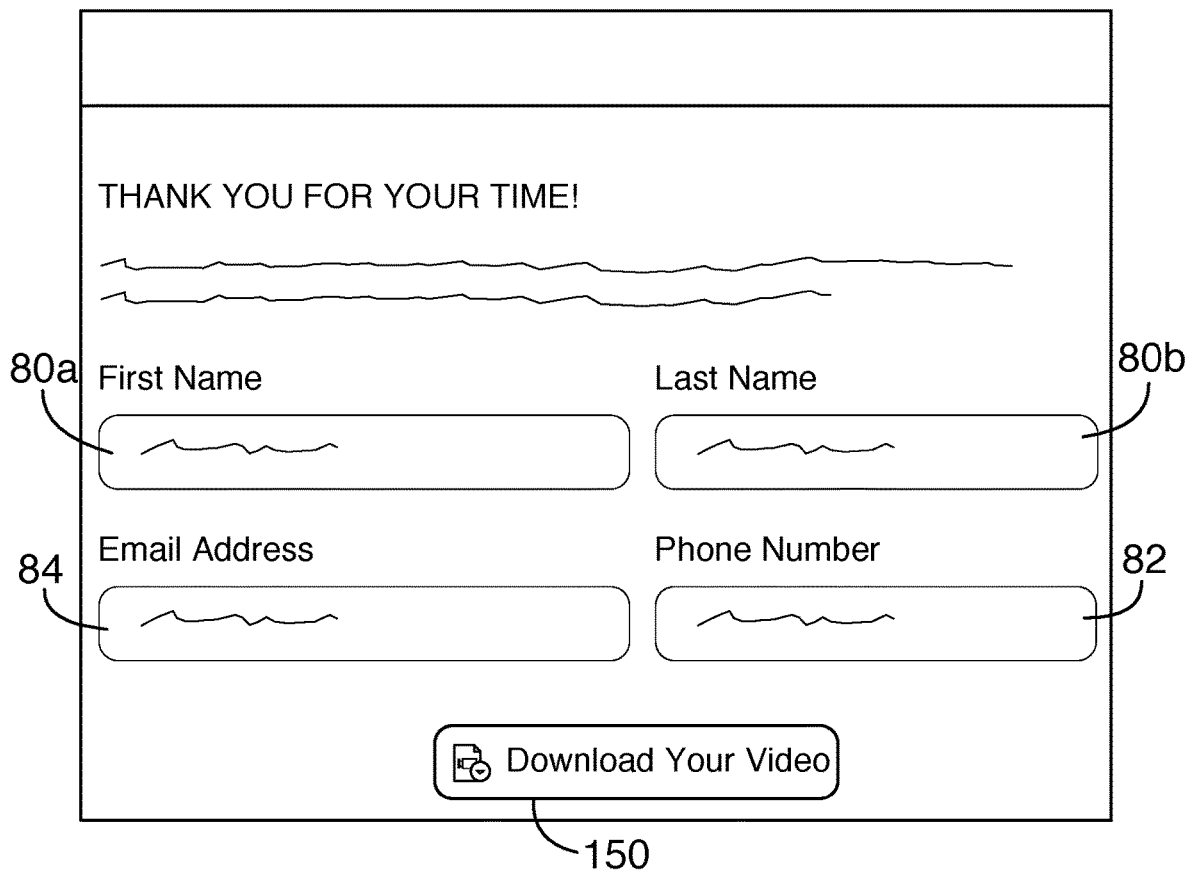
FIG. 10 is a video download window of the system of FIG. 1, showing a download link and website visitor personal name and email address/SMS number entries thereof.

The potential customer 92 may, according to some preferred embodiments of the invention, remain anonymous (as shown in FIGS. 7A, 8, and 9) at this point and/or have an option to communicate through voice 122, live chat, and/or SMS 114 while the salesperson may be live on video.

Customer-side interface examples are shown in FIGS. 7A, 7B, and 9.

The vehicle salesperson 102 may preferably be provided with an interface (as shown in FIG. 8) which enables the salesperson 102, according to the invention, to show and/or treat this video call 90 the same way as the salesperson 102 might someone who walks into the dealership.

Preferably, after the potential customer 92 finishes the video call, the customer may be presented with an interface and/or pop-up (as shown in FIG. 10) which prompts and/or enables, according to the invention, download 150 of a complete (or substantially complete) record of the conversation, preferably including a copy of the video 240 and/or other media associated, with the vehicle dealership salesperson 102.

In this manner, the invention may preferably enable the potential customer 92 to keep the record 240 for their own purposes, etc.

Figure 15:
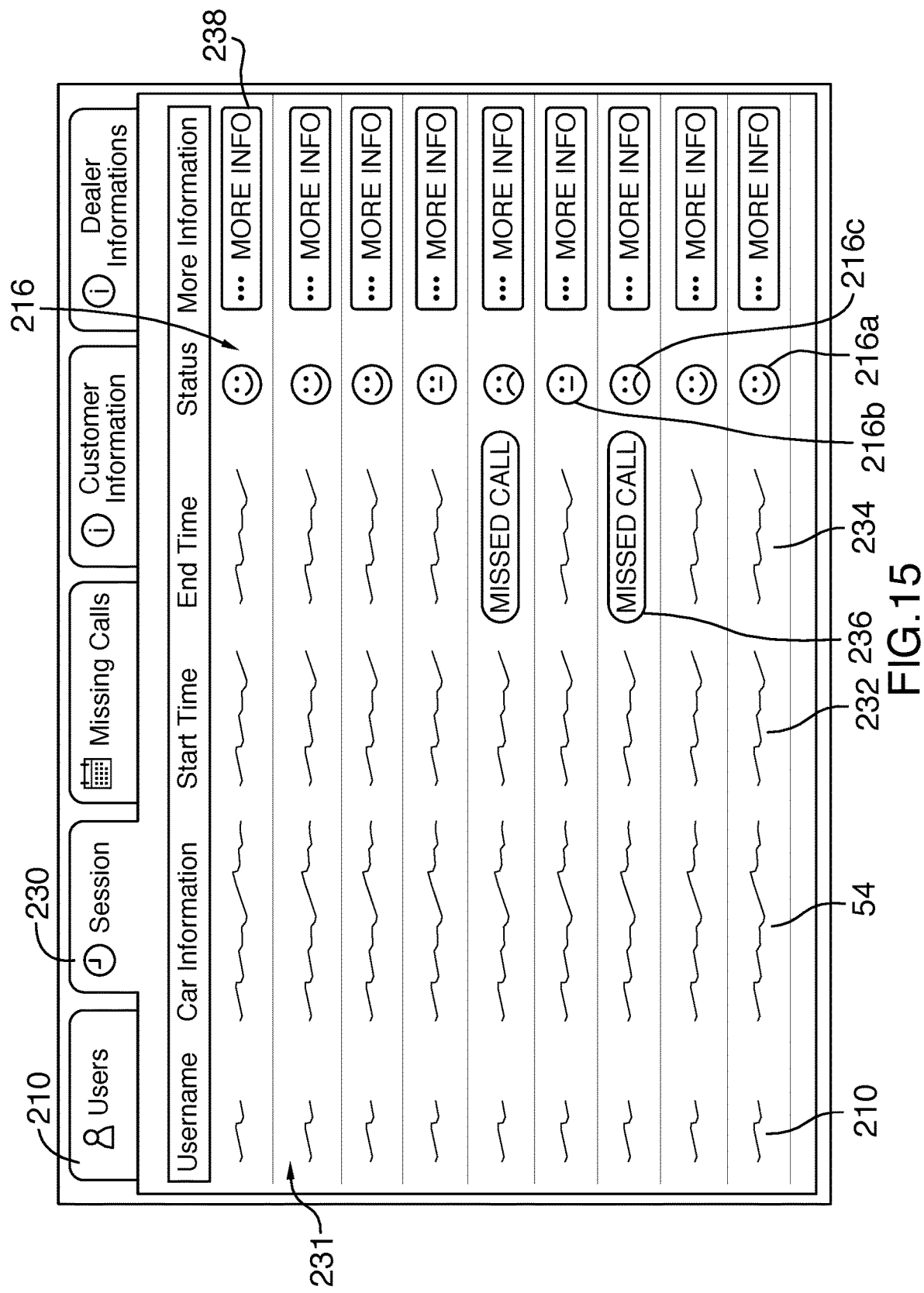
FIG. 15 is another view of the dealership administrator interface of FIG. 14, showing a dealership storage subsystem thereof.
Figure 16:
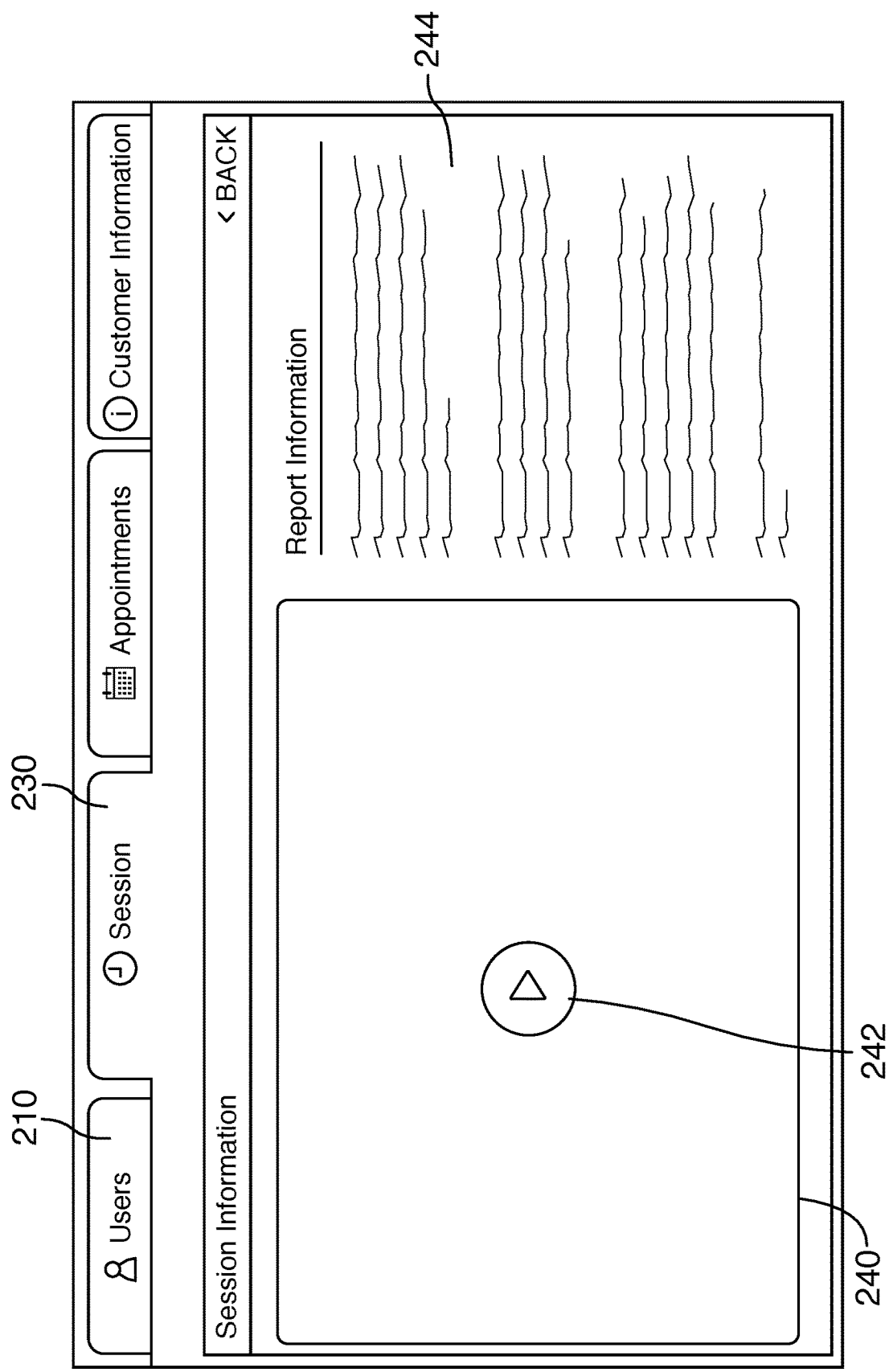
FIG. 16 is another dealership administrator interface of the system of FIG. 1, showing a copy of a session recording stored in the dealership storage subsystem.
Figure 17:
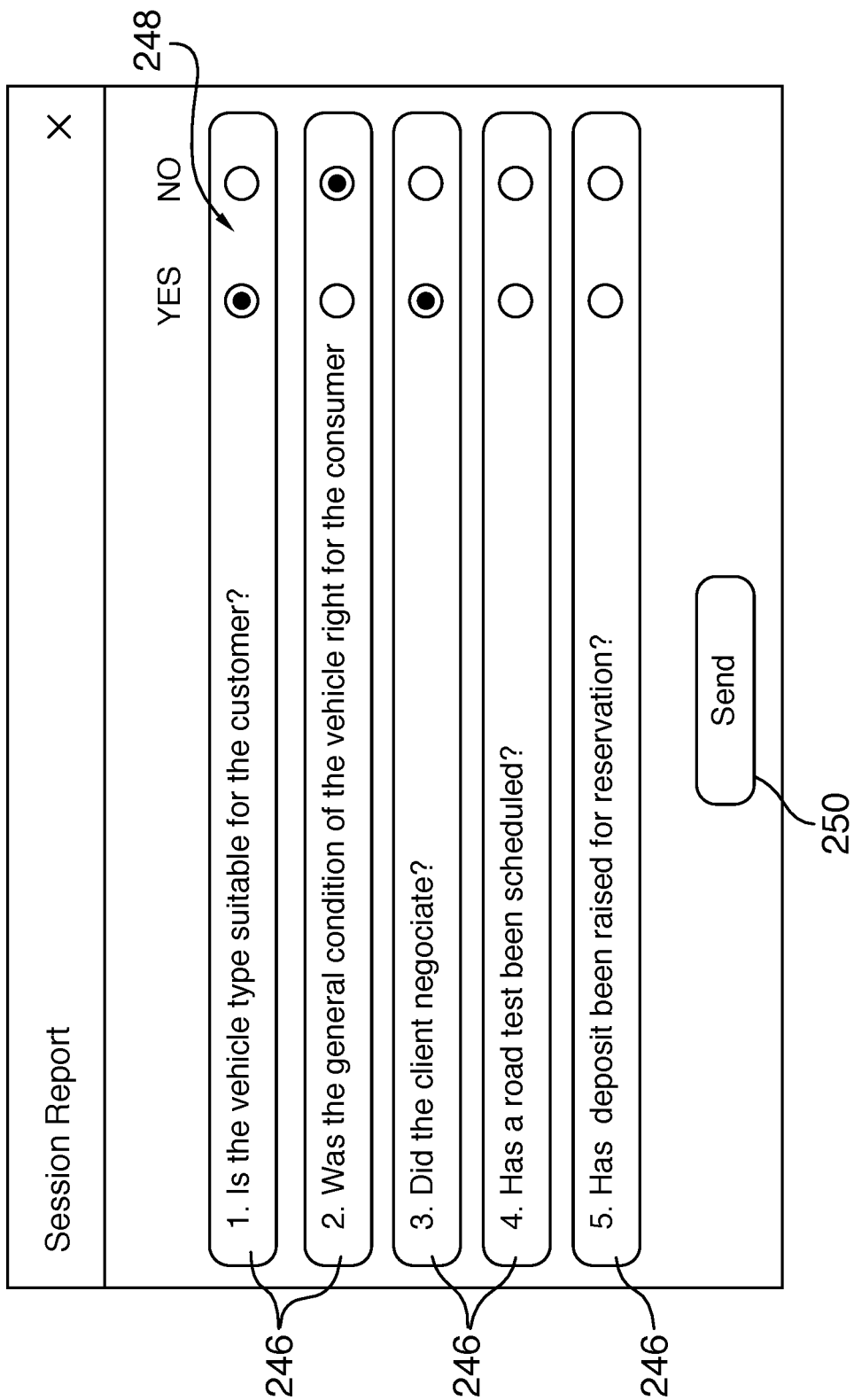
FIG. 17 is a session report window of the system of FIG. 1.
Figure 18:
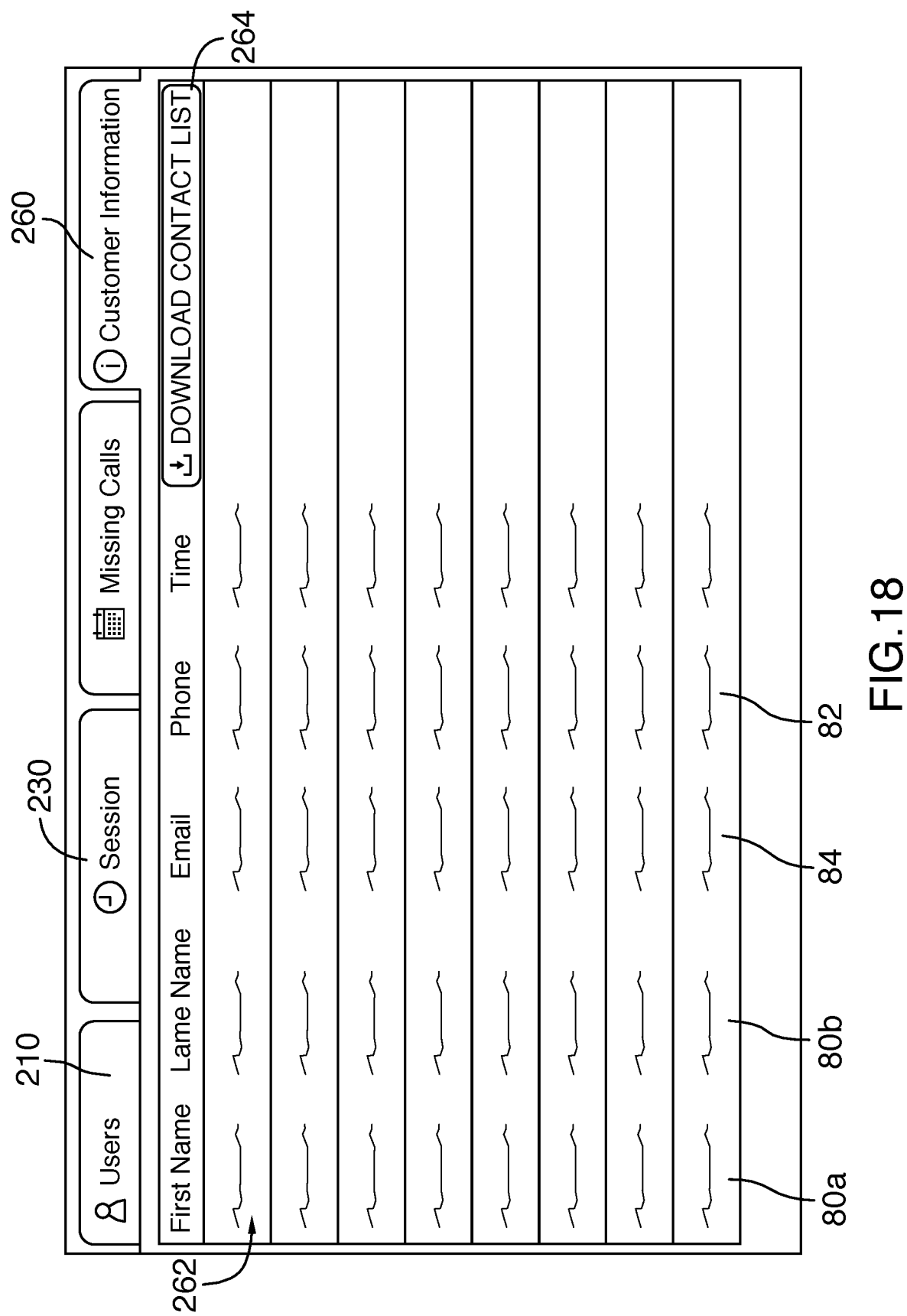
FIG. 18 is another view of the dealership administrator interface of FIG. 16, showing customer information stored in the dealership storage subsystem.
Figure 19:
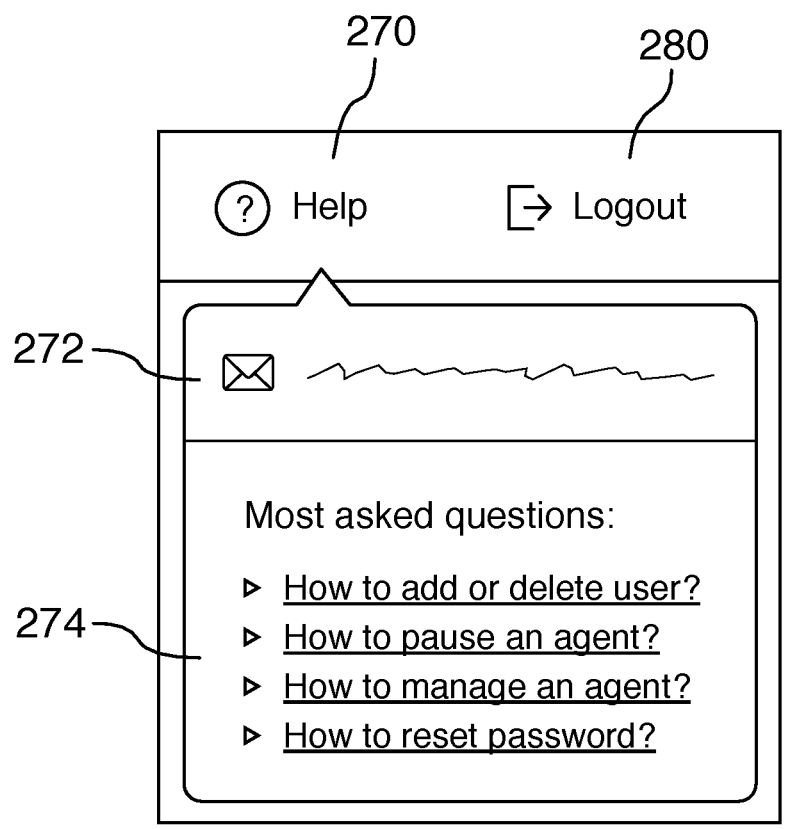
FIG. 19 is a help window and logout button of the system of FIG. 1.

To download the record 240 (e.g., a copy of the video call), according to one aspect of the invention, the potential vehicle dealership customers 92 may preferably be asked to identify themselves by email 84, and/or by one or more other pieces of personally identifying data 80a, 80b and/or indicia 82 (as shown in FIG. 10). And, afterwards, the vehicle dealership 106 and/or salesperson 102 may preferably be provided with lead information concerning the potential vehicle sale (as shown in FIGS. 15, 16, and 18), and/or the potential customer 92 may be provided with the copy 240 of the video call or other record by email and/or download (as may be best appreciated from FIGS. 10 and 11) to keep in reference to a potential vehicle 108 purchase.

Figure 11:
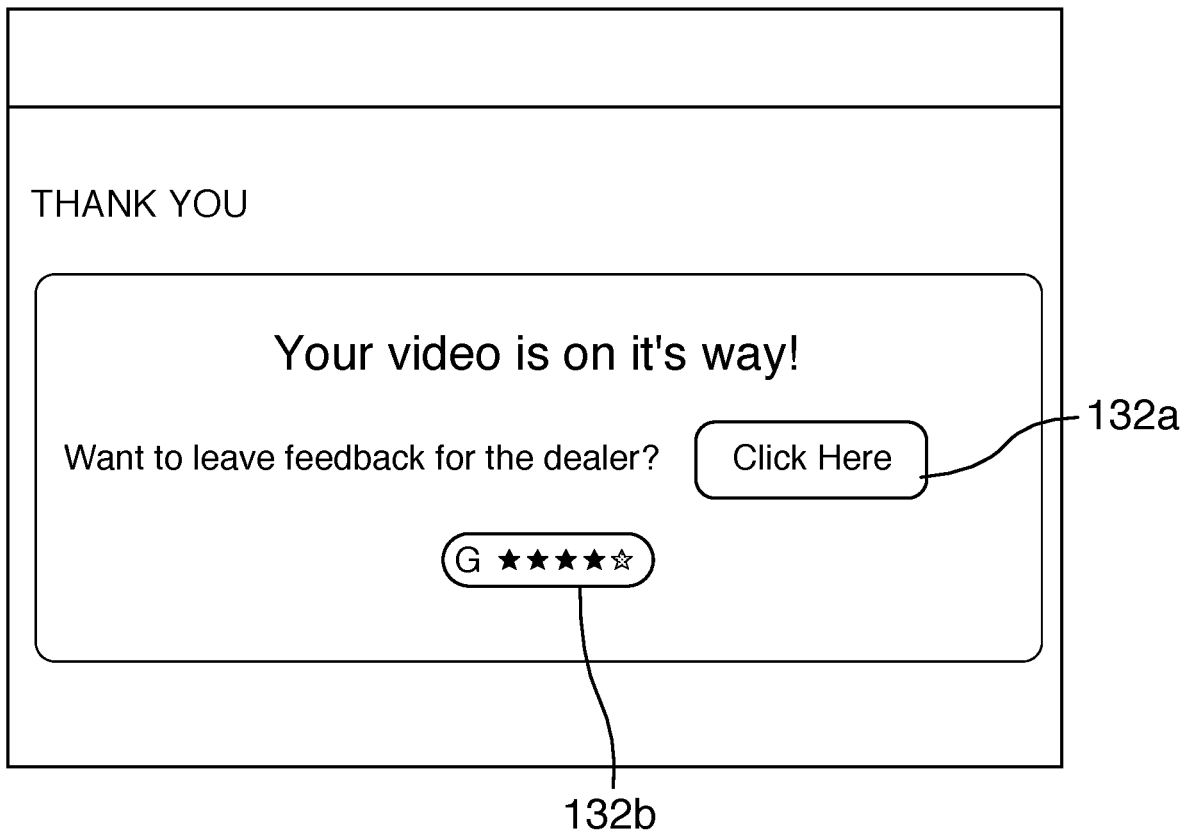
FIG. 11 is a feedback prompt of the system of FIG. 1.

According to some aspects of the invention, the device, system, method and/or computer readable medium according to the invention may send, or help to send, the video 240 (as may be best appreciated from FIGS. 10 and 11) to the potential customer's email address 84 and/or ask the potential customer to share their feedback 132*a*, 132*b* concerning the vehicle dealership video call via social media (e.g., for others to access via Google search and/or social media) as shown in FIG. 11.

Calls-to-action 70 from a vehicle dealer's website (as shown in FIGS. 1 to 3) may preferably link directly to a live portal of a software application or app according to the invention. A user may preferably simply click on a call-to-action button 70 (e.g., one which says "see the car live now") and everything may then be done within the app.

Preferably, the app may then prompt the visitor to choose a time frame 72, 74 in which they would like a video meeting to start. The visitor 92 may preferably be prompted with a few options for times 72, 72, 72, or with a calendar selection 74 where they can opt-in to choose whatever time(s) 76 may be available.

Preferably, after a dealership receives notification (for example, as shown in FIG. 5) that a visitor 92 would like to see a vehicle 'Live', the dealership 106 may—according to an aspect of the invention—be afforded an opportunity to prepare the vehicle 108 and get the vehicle's keys ready to show the vehicle 108 to the website visitor 92 (as best seen in FIG. 9) within the time frame 72, 74 they selected.

Preferably, after the user's selected time counts down 62 to zero (as may be best appreciated from FIG. 5), a chat box 90, 100, 110 may simply open on the user's computer (as best seen in FIG. 9).

Preferably, at substantially the same time, a similar chat box 90, 100, 110 may open simultaneously once again on a predetermined dealership salesperson's BYOD phone and/or other mobile communications device (as best seen in FIG. 8).

Preferably, at that point, the website visitor 92 and the predetermined dealership salesperson 102 then will be connected with one another in a live video conference 90, 100.

The website visitor/user 92 may preferably, according to one aspect of the invention, be afforded an option to selectively: (1) remain anonymous by video, and choose to discuss and be heard by voice only, as shown in FIG. 7A; (2) simply use text and/or SMS 114 so that the website visitor/user 92 may remain completely anonymous by video and voice, as shown in FIG. 8; and/or (3) to be one-on-one in a live video chat conference 90, 100 where the salesperson 102 can see the client 92 and the client 92 can see the salesperson 102, vice versa, as shown in FIG. 7B.

Figure 12:
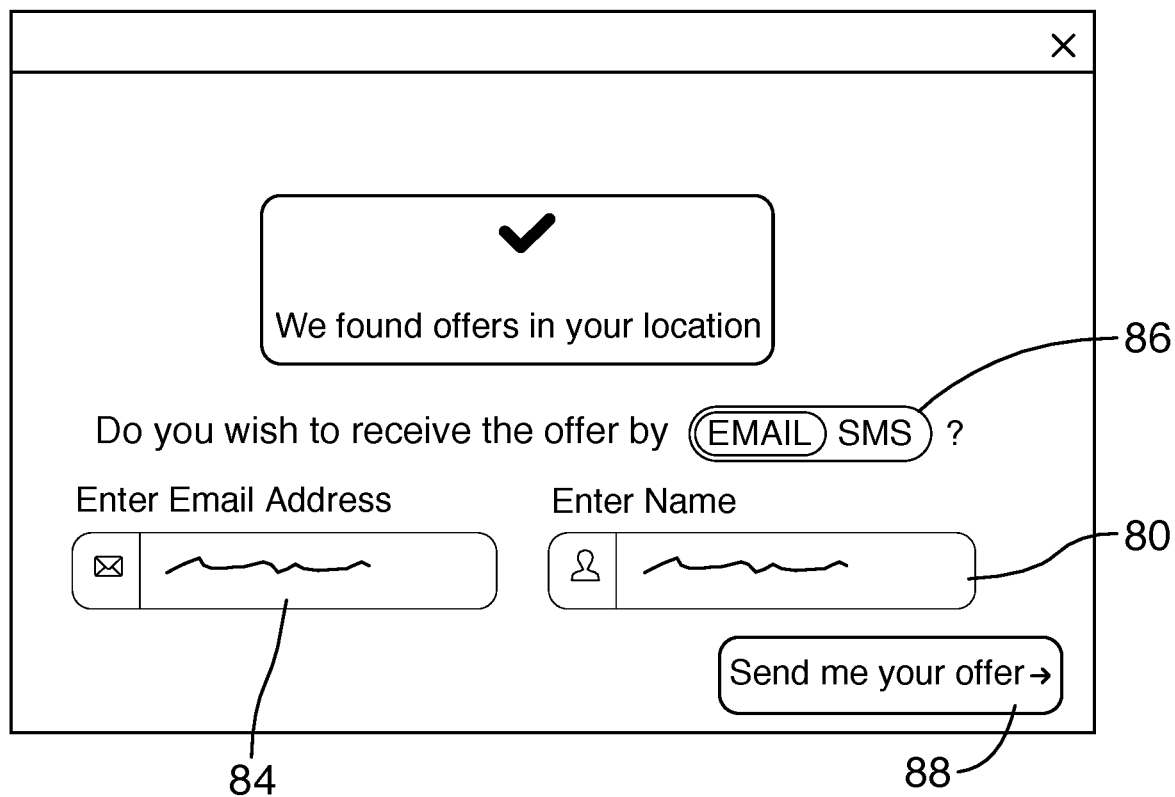
FIG. 12 is an offer prompt of the system of FIG. 1, showing website visitor personal name and email address entries thereof.
Figure 13:
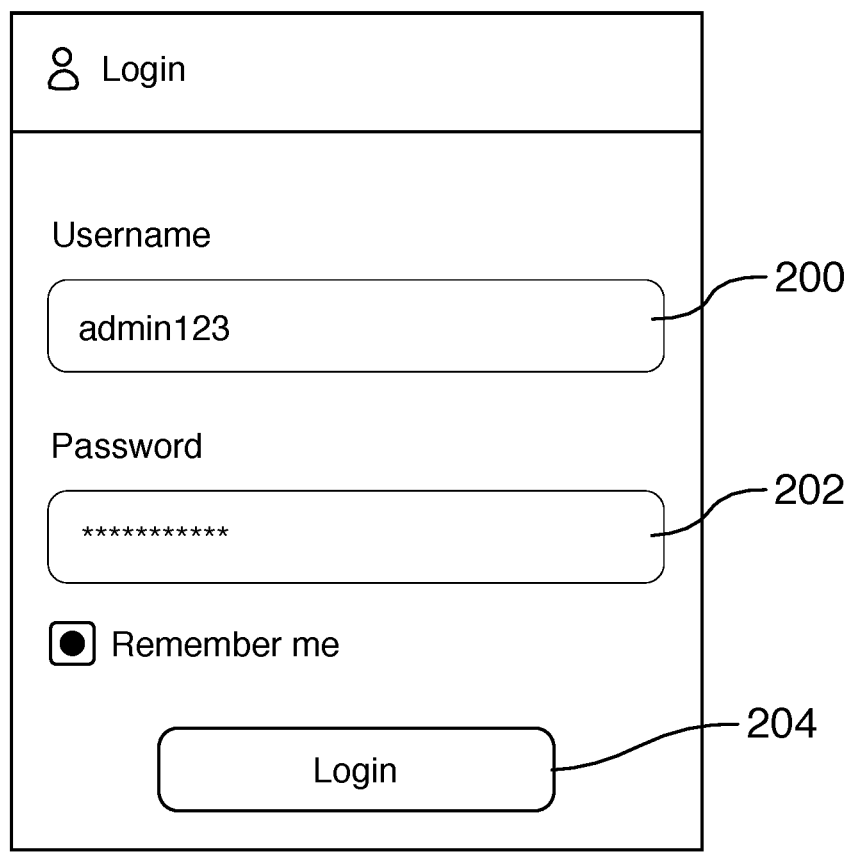
FIG. 13 is a log-in window of the system of FIG. 1.
Figure 14:
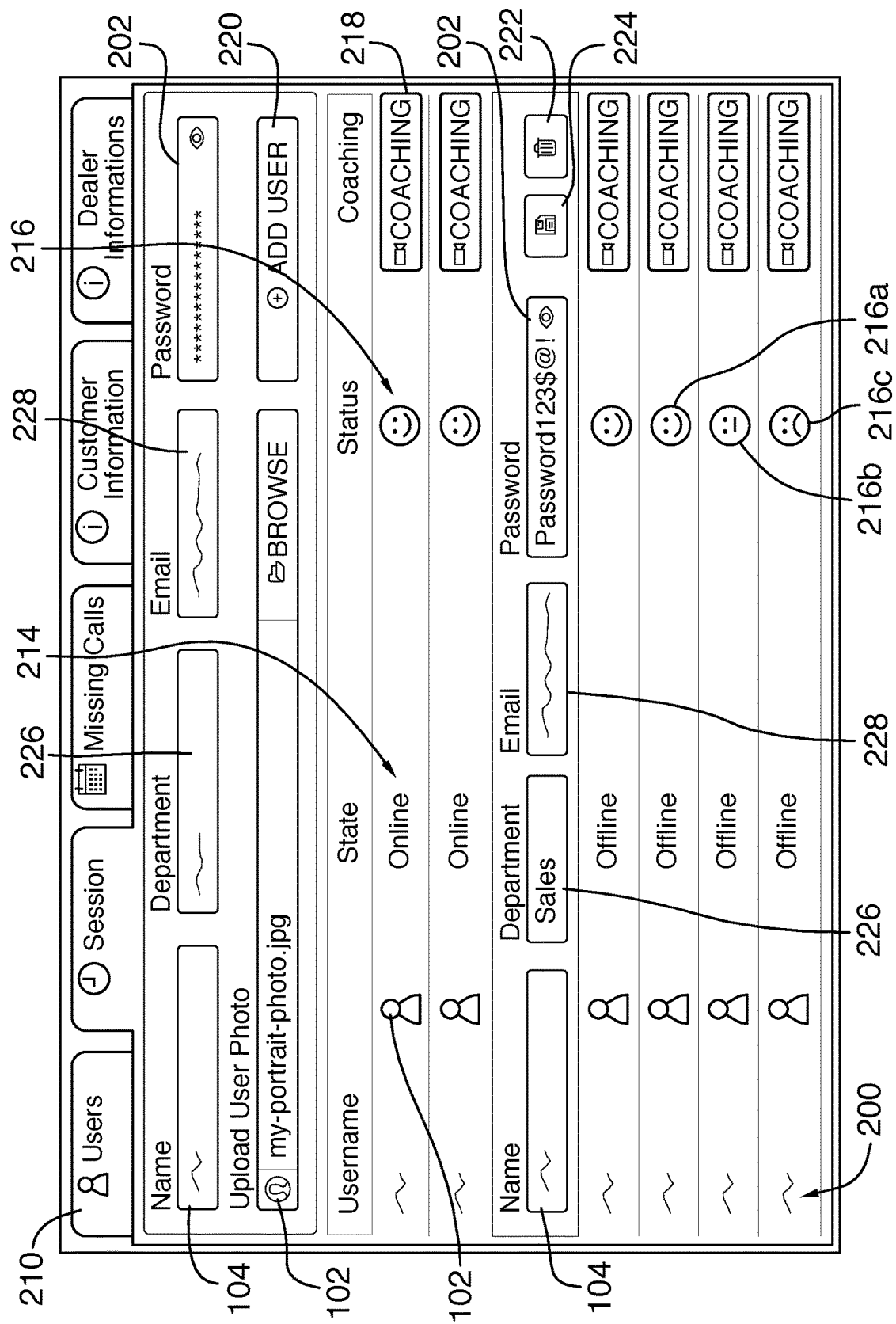
FIG. 14 is a dealership administrator interface of the system of FIG. 1, showing positions of salespeople in a dealership queue thereof.

After the salesperson 102 and client 92 video meeting 90, 100 has finished, the vehicle dealership website visitor/user 92 may be presented with multiple choices and/or directions to proceed with a potential vehicle purchase (as may be best appreciated from a consideration of FIGS. 10 and 12). For example, the website visitor 92 may be afforded an option to book a meeting 58 with the dealership salesperson 102 for a test drive and/or to come in and finalize the vehicle sale.

Also or instead, the website visitor 92 may be afforded an option to indicate via the app, according to the invention, if they want to trade-in their current vehicle as part of the transaction (as may be best appreciated from a consideration of FIG. 12). In such case, the call 90, 100 may preferably be transferred 128 from the salesperson 102, within the app, to another dealership team member, who does appraisals for the potential customer 92 to provide a walk-through and/or show the dealership 106 one or more potential trade-in vehicles. Afterwards, proper offers and arrangements may preferably be made, according to the invention, with a view to concluding one or more vehicle transactions (as shown in FIG. 12).

According to an aspect of the invention, the app may also afford an option 128 for the website visitor 92 to preferably obtain more information from a different and/or second dealership salesperson 102, who may preferably know more or different specific details concerning one or more vehicles 108 of potential interest. The second dealership salesperson 102 may preferably, according to one aspect of the invention, be able to provide a more descriptive answer to questions which the original salesperson 102 was unable or less suited to answer. According to the invention, the website visitor 92 may thus be afforded with a ready opportunity, within the app, to access an appropriate level of experience among the various dealership staff (who may all have access to the app) to facilitate the vehicle transaction. The website visitor 92 thus, if and as appropriate, may be advantageously shuffled back and forth 128 among vehicle dealership members and the vehicle sales team for the benefit of the website visitor 92 at any point.

For a preferable dealership-side experience, an "up system" may preferably be recommended for this application. After the vehicle salesperson 102 arrives at work, he or she may preferably sign-in 204 to the application according to the invention (as shown in FIG. 13). The vehicle salesperson 102, 104 then may be given a place (e.g., first) in line to receive meeting notifications throughout the sales team. After a first salesperson 102 has joined in a meeting with the client 92, the app may preferably notify one or more others on the vehicle sales team, who have signed-in to the app, of the advancement of meetings. One or more of these features of the invention may be best appreciated from a consideration of FIG. 14.

After the first salesperson 102 has started a meeting 90, 100, 110, the app may preferably notify a second salesperson that they will be up next. The app may preferably tell them to get ready for a meeting. Similarly, a third salesperson may be notified that he or she has moved up in line to the second spot. Preferably, with a fourth salesperson being notified that they have moved to the third spot, and so on. The app may preferably give one or more of the salespeople 102 a "ballpark" or approximate time frame as to how long they might expect to wait before they will be asked to join a live call. Preferably, the invention may thus afford the vehicle dealership 106 and/or its salespeople 102, 104 with an appropriate and/or improved time management resource for its various vehicle salespeople 102, 104, etc. The invention, in this manner and/or otherwise, may enable dealership salespeople 102, 104 to appropriately ready themselves to host a live call 90, 100, 110 after a visitor 92 asks to see a vehicle 108 live.

After a call 90, 100, 110 has been completed, the app may prompt the website visitor 92 to leave his or her information for the dealership (as best seen in FIG. 10). Preferably, in exchange, the visitor 92 may receive a download link 150 to the sales call, as documented on video 240, for recall and use by the potential customer 92, the dealership 106, and/or the vehicle salesperson 102.

The application according to the invention preferably provides a first non-committed video chat application 90, 100 in the vehicle dealership world. It enables users to connect with a vehicle dealership 106 without signing-in, downloading or installing any software beyond a web browser.

Preferably, the invention may enable vehicle salespeople 102 in a dealership 106 to remotely host meetings with potential customers 92 via software to show one or more selected vehicles 108 of potential interest to the customer 92, at any given time, without having to prepare and/or ask the client 92 to attend the dealership 106. Preferably, use of the invention may help to save time for the vehicle sales team and/or potential customers 92 who simply want to see selected vehicles 108.

Preferably, use of the invention may bring, or help bring, walk-in traffic of potential customers 92 to vehicle dealerships 106. Preferably, the app may bring, or help bring, sales opportunities for vehicle dealerships 106, preferably without hassle or inconvenience to the visitors 92 of vehicle dealership websites.

Preferably, the app may be readily installed and/or used by vehicle dealerships and salespeople 102, typically all on a single and/or one and the same day, if and as may be needed and/or desired. Preferably, the app may be readily installed on the same day, perhaps within about ten (10) minutes or less. Preferably, the app takes only minutes to install on a dealership website, with little or no technical expertise or help from a developer. Preferably, after and/or during installation, the dealership may simply choose its calls-to-action 70, pay a subscription fee, and/or insert a snippet into a desired location. According to the invention, the dealership's vehicle sales (and vehicle trade-in) team may preferably download the app.

According to the invention, the app may preferably work and/or integrate well with a dealership's existing vehicle sales flow. According to some preferred embodiments, the invention may be installed and used by the vehicle dealership's team for a single price and/or without accruing any additional and/or unexpected costs, etc. According to some preferred embodiments, the invention may be installed and used by the vehicle dealership's team for a fixed price no matter how many cars may be sold in association with its use.

In the prior art, prospective buyers may have visited and left vehicle dealership websites, with a less than ideal website and/or vehicle buying experience. Likewise prospective buyers, who were persuaded to share their personal and/or identifying information, may have been solicited by a team of agents to further persuade them to come into the dealership to see one or more vehicles. This business model may have been somewhat inefficient and/or yielded suboptimal results.

According to the invention, on the other hand, website visitors 92 may preferably be afforded an opportunity to actually see particular vehicles 108 at the dealership 106 in real time.

Use of the invention may preferably promote walk-ins by, and/or engagement with, potential vehicle purchasers 92. Use of the invention may preferably promote trust between potential vehicle customers 92 and a vehicle dealership's sales team 102, while tracking and building goodwill with a growing number of prospective customers (as shown in FIG. 18). Preferably, whether or not a prospective customer 92 likes one or more vehicles 108 of potential interest, the vehicle salesperson 102 will have been afforded an opportunity to form and/or develop a budding relationship with the prospective customer 92.

Preferably, use of the invention may connect, or help to connect, dealership website visitors 92 with vehicle salespeople 102 via the app, which preferably (substantially immediately) enables them to see one or more vehicles 108 of potential interest in real time and/or on their terms.

Preferably, the app may allow website visitors and potential vehicle purchasers 92 to remain substantially anonymous, to save time, and/or to better enjoy the vehicle sales process, preferably at least in part because of one or virtual vehicle sales features which are provided according to the invention. Preferably, dealership customers 92 may be provided with an improved vehicle buying experience.

In use of the app, according to the invention, a website visitor 92 may preferably click a "SEE CAR LIVE NOW" button 70. The website visitor 92 may preferably choose a time 82, 84 (at their own convenience) to meet virtually with a vehicle salesperson 102. That may preferably alert a Sales Manager, or another responsible person, at the vehicle dealership 106 to prepare the vehicle 108 to be shown. Preferably, in the meantime, a timer 62 may provide a count down until the client/salesperson meeting. During that time, the potential client 92 may preferably continue to browse inventory and/or other content on the dealership website or elsewhere. After the timer 62 hits zero, the potential vehicle buyer 92 may preferably be live (one on one) with a predetermined dealership salesperson 102 adjacent to the vehicle 108 of their choice. Through the app, according to the invention, a vehicle shopper 92 may preferably see and hear (and/or virtually touch) one or more vehicles 108 of potential interest all from the comfort of their own web browsing environment.

Preferably, the app may be easy and ready to use by the vehicle dealership sales team. The app may preferably seamlessly manage the vehicle dealership sales workflow, preferably by sending out one or more notifications and/or recording some of all of sessions (as shown in FIGS. 15 and 16) for quality control and/or training purposes. Preferably, a vehicle dealership management team may be able to monitor all activity via the system according to the invention. One or more prospective vehicle purchasers may preferably, according to the invention, be prompted to leave feedback 132a, 132b after their respective sessions.

Preferably, use of the invention may help vehicle dealerships 106 to identify, incent, and/or encourage prospective shoppers 92 who may be most likely, or made more likely, to visit the dealership 106 to finalize a vehicle 108 purchase.

Preferably, according to the invention, the app may connect potential vehicle purchasers 92 with dealerships 106 and salespeople 102 while providing a simple-to-use and/or transparent vehicle buying platform and/or experience.

There may have been a time not so long ago, when vehicle dealerships and the showroom floors were the primary places for prospective vehicle buyers to best experience and learn about any vehicles of potential interest. Vehicle buying experiences and associated sales relationships may have previously formed out of and/or been centered around the vehicle dealerships. With technology, websites, and other advances, however, the vehicle buying experience evolved and/or prospective buyers might better search for vehicles from the comfort of their own homes. Still, the vehicle buying experience may have been less than ideal. It may have been somewhat difficult for prospective buyers to locate an appropriate and/or desired vehicle online without an expert. The human connection between prospective buyers and vehicle dealerships (and their salespeople) may have suffered and/or been lost. And/or, vehicle dealership walk-ins may have lessened and/or decreased. Prospective buyers may have had little or no help in navigating potentially complicated vehicle dealership websites. The limited information, images, and/or photographs of vehicles available on the website may have been less than desirable.

Use of the invention, on the other hand, may preferably help to improve the vehicle buying experience for vehicle dealers, salespeople 102 and buyers 92 alike. Use of the invention may preferably help to increase vehicle dealership 106 walk-ins, and/or to increase connections between vehicle salespeople 102 and prospective vehicle buyers 92 (who can initially form a personal connection from wherever they may be and/or view the car in real time). Preferably, use of the invention may be much like having a prospective vehicle buyer 92 on the dealership's showroom floor 106. Preferably, a relationship may be formed and/or the vehicle buying experience may be improved.

A prospective vehicle buyer 92 clicks a "SEE CAR LIVE NOW" button 70 via their web interface. One of the dealership's sales people 102 may preferably take the video call, welcome the prospective buyer 92, and/or give them a live tour of the desired vehicle 108.

According to the invention, the prospective vehicle buyer 92 may ask one or more questions of the dealership salesperson 102 and have them answered substantially in realtime from the comfort of their own personal surroundings. In this way, the vehicle buyer 92 may advantageously be given a sense of being right there on the dealership showroom floor 106. And, if a prospective buyer 92 likes what they see, they may be readily afforded with an opportunity to book an in-person appointment, to sign any required documents, and/or to take delivery of their new (or used) vehicle 108.

According to the invention, a vehicle dealership 106 may get the app, prospective buyers 92 may click a button 70 see actual vehicles 108 live. From there, the salespeople 102 and buyers 92 may book a date 72, 74 to complete any required paperwork and/or deliver a new or used vehicle 108.

In comparison to prior art, one advantage of the invention may be that it preferably does not require any download or installation of software (other than a web browser).

The invention is contemplated for use by or in association with vehicle buying, customers 92, dealerships 106, and/or salespeople 102 and/or with BYOD systems, methods, and/or computer readable media. The invention, however, is not so limited. Other embodiments, which fall within the scope of the invention, may be provided. Preferably, devices, apps, systems, methods, and/or computer readable media according to the invention may be used for, and afford advantageous utilities with, industries and/or retail environments other than those associated with vehicle dealerships.

The foregoing description has been presented for the purpose of illustration and is not intended to be exhaustive or to limit the invention to the precise form disclosed.

Naturally, in view of the teachings and disclosures herein, persons having ordinary skill in the art may appreciate that alternate designs and/or embodiments of the invention may be possible (e.g., with substitution of one or more components for others, with alternate configurations of components, etc). Although some of the components, relations, configurations and/or steps according to the invention are not specifically referenced in the accompanying drawings or in association with one another, they may be used, and/or adapted for use, in association therewith. For example, features may be depicted or discussed herein in the context of the device, which clearly could be recast as the steps of a method, the inter-workings of a system, and/or recorded on computer readable media. (And, vice-versa.) All of the depicted and aforementioned and various other features, steps, inter-workings, structures, configurations, relationships, utilities, and/or the like (any of which may be depicted and/or based hereon) may be, but are not necessarily, incorporated into and/or achieved by the invention. Any one or more of the depicted and aforementioned features, steps, inter-workings, structures, configurations, relationships, utilities and the like may be implemented in and/or by the invention, on their own, and/or without reference, regard or likewise implementation of any of the other depicted or aforementioned features, steps, inter-workings, structures, configurations, relationships, utilities and the like, in various permutations and combinations, as will be readily apparent to those skilled in the art, without departing from the pith, marrow, and spirit of the disclosed invention.

Other modifications and alterations may be used in the design, manufacture, and/or implementation of other embodiments according to the present invention without departing from the spirit and scope of the invention, which is limited only by the claims of this patent application, of any patents issuing herefrom or reissues thereof.

PARTS LIST

The following numbers have been used herein and in the accompanying drawings to denote certain parts, elements, and features of the invention:

Search results 50
Static vehicle images 52
Vehicle printed details 54
Other Dealer contact means 56
Schedule in-person meeting/test drive button 58
Confirm availability button 60
Timer window countdown and alert notification 62
Pause countdown button 64
Close timer button 66
Live video button 70
Video chat times 72, 74
Video chat time preset options 72
Custom video chat time 74
Calendar interface 76
Submit 78
Visitor name/nickname 80
Visitor first name 80*a*
Visitor last name 80*b*
Telephone/SMS number entry 82
Email address entry 84
Email/SMS selector 86
Deliver offer button 88
Salesperson video chat window shows visitor live communication 90
Website visitor (and website visitor image/avatar) 92
Visitor video chat window shows salesperson live audio and video 100
Salesperson 102
Salesperson name 104
Dealership 106
Vehicle 108
Chat frame 110
Dealer message 112
Visitor message 114
Message entry field 116
Send message 118
Attach document 120
Communication buttons 120, 122
Camera on/off 120
Mic on/off 122
Hang-up button 124
Signal strength indicator 126
Call transfer button 128

Session timer 130
Feedback prompts 132*a*, 132*b*
Download link 150
Usernames entries (in dealership queue) 200
Password 202
Log-in button 204
Users tab 210
User listings 212
User state 214
User status 216
Good user status 216*a*
Neutral user status 216*b*
Bad user status 216*c*
Coaching 218
Add user 220
Delete user 222
Save user update 224
User department entry 226
User email address entry 228
Session tab 230
Session entries 231
Session start time 232
Session end time 234
Missed call 236
More information button 238
Session recording 240
Play/pause session recording 242
Session report details 244
Session report queries 246
Yes/no radio buttons 248
Session report send 250
Customer tab 260
Customer entries 262
Download customers/contacts button 264
Help menu button 270
Email help questions link 272
Frequently asked question links 274
Admin logout button 280

What is claimed is:

1. A consumer goods sales management and video chat system, for use with a salesperson's networking electronic device that is local to a salesperson at a place of business and with a standard web browsing application running on a visitor's networking electronic device that is local to a website visitor who is remote from the place of business, with the system comprising:
   at least one desired consumer good that is physically located onsite at the place of business and available for potential acquisition by the website visitor;
   a business website that is remote from and presented to the website visitor via the standard web browsing application;
   listings on the business website that comprise at least one available consumer good listing which corresponds to the desired consumer good;
   a live video button, substantially adjacent to the available consumer good listing on the business website, that is selectively engageable by the website visitor;
   a scheduling window that is presented to the website visitor, via the standard web browsing application, after the website visitor has selectively engaged the live video button; wherein the scheduling window enables the website visitor to select a predetermined video chat time;
   a dedicated consumer goods sales application running on the salesperson's networking electronic device;
   an alert notification that is presented to the salesperson, via the dedicated consumer goods sales application, after the website visitor has selected the predetermined video chat time;
   a visitor video chat window that, starting substantially at the predetermined video chat time, presents live audio and video from the place of business, via the dedicated consumer goods sales application running on the salesperson's networking electronic device, substantially in real-time, to the website visitor via the standard web browsing application; wherein the live audio and video from the place of business comprises live audio and video of the desired consumer good;
   a salesperson video chat window that, starting substantially at the predetermined video chat time, presents live communication from the website visitor, via the standard web browsing application, substantially in real-time, to the salesperson via the dedicated consumer goods sales application;
   a business storage subsystem that is remote from the website visitor;
   a session recording of the live audio and video from the place of business and the communication from the website visitor; wherein the session recording is securely stored by the business storage subsystem;
   a hang-up button that is presented to the website visitor via the standard web browsing application and to the salesperson via the dedicated consumer goods sales application, and is selectively engageable to close the visitor video chat window and the salesperson video chat window; and
   a video download window that is presented to the website visitor, via the standard web browsing application, after selective engagement of the hang-up button; wherein the video download window enables the website visitor to selectively download and store a copy of the session recording to the visitor's networking electronic device.

2. The system according to claim 1, further comprising one or more communication buttons that are presented via the standard web browsing application, and are selectively engageable by the website visitor to present, as said live communication, one or more of the following inputs as received by the visitor's networking electronic device: text only; voice only; and voice and video together.

3. The system according to claim 1, further adapted for use by other business personnel at the place of business and at other business places, and further comprising a call transfer button that is presented to the website visitor via the standard web browsing application and to the salesperson via the dedicated consumer goods sales application, and is selectively engageable to transfer the salesperson video chat window to an appropriate one of the other business personnel based on at least one of: the live audio and video from the dealership; the desired consumer good; and the live communication from the website visitor.

4. The system according to claim 3, wherein when the website visitor has a potential trade-in consumer good for appraisal as part of the potential acquisition of the desired consumer good, the appropriate one of the other business personnel is a consumer goods appraiser.

5. The system according to claim 1, wherein the scheduling window enables selection of the predetermined video chat time from among one or more preset options.

6. The system according to claim 1, further comprising a timer window that is presented via the standard web browsing application after the website visitor has selected the predetermined video chat time, and counts-down any time remaining until the predetermined video chat time; and wherein the system enables the website visitor to continue otherwise using the standard web browsing application until the predetermined video chat time.

7. The system according to claim 1, wherein the alert notification prompts the salesperson to prepare, before expiry of any time remaining until the predetermined video chat time, a live presentation of the consumer good for the website visitor.

8. The system according to claim 1, wherein the video download window requires entry of a personal name and an email address/SMS number for the website visitor before delivering, to the email address/SMS number, a download link that enables the website visitor to, as aforesaid, selectively download and store a copy of the session recording to the visitor's networking electronic device; and wherein the business storage subsystem stores the personal name and the email address/SMS number and provides the personal name and the email address/SMS number to the salesperson and the place of business.

9. The system according to claim 1, further comprising a feedback prompt that is presented to the website visitor, via the standard web browsing application, after the video download window; wherein the feedback prompt enables the website visitor to share feedback concerning the live audio and video for access by the place of business and potentially via social media for third party access.

10. The system according to claim 1, further comprising a business prompt that is presented to the website visitor, via the standard web browsing application, after the video download window; wherein the business prompt enables the website visitor to schedule an in-person meeting with the salesperson to see the consumer good in-person and to advance the potential acquisition of the consumer good by the website visitor.

11. The system according to claim 1, further comprising a trade-in prompt that is presented to the website visitor, via the standard web browsing application, after the video download window; wherein the trade-in prompt enables the website visitor to schedule a video chat with the place of business for appraisal of a potential trade-in consumer good as part of the potential acquisition of the desired consumer good.

12. The system according to claim 1, further adapted for use by a number of other salespeople at the place of business and at other business places and for use with a current volume of website traffic, and further comprising:
a log-in window that enables the salesperson to log-in to the dedicated consumer goods sales application after arriving at the place of business;
a business queue of the other salespeople at the place of business and at any said other business places who have logged-in to the dedicated consumer goods sales application, with the business queue being stored in the business storage subsystem;
a business processor that calculates: a position of the salesperson in the business queue based on when the salesperson logged-in to the dedicated consumer goods sales application; and, based on the position of the salesperson in the business queue and on the current volume of website traffic, an estimated time until the salesperson will be presented with the alert notification as aforesaid; and
a time estimate notification that is presented to the salesperson, via the dedicated consumer goods sales application, after the salesperson has logged-in as aforesaid; wherein the time estimate notification comprises the estimated time and the position of the salesperson in the business queue.

13. The system of claim 12, wherein after the alert notification is presented to the salesperson, the business processor calculates updated positions of the other salespeople in the business queue, and new estimated times based on the updated positions of the other salespeople in the business queue and on the current volume of website traffic; and wherein the dedicated consumer goods sales application presents the new estimated times to the other salespeople in the business queue.

14. The system of claim 1, further comprising a business administrator interface that enables the place of business to monitor, review, and manage all information and activity related to the business website, the website visitor, the listings on the business website, the available consumer good listing, the dedicated consumer goods sales application, the salesperson, the live audio and video from the place of business, the live communication from the website visitor, the business storage subsystem, and the session recording, for quality control and training purposes.

15. A method of consumer goods sales management and video chat, for use with a salesperson's networking electronic device that is local to a salesperson at a place of business and with a standard web browsing application running on a visitor's networking electronic device that is local to a website visitor who is remote from the place of business, with the method comprising:
a listing step of using the standard web browsing application, running on the networking electronic device that is local to the website visitor, to present: (a) at least one available consumer good listing among listings on a business website, wherein the available consumer good listing corresponds to a desired consumer good that is physically located onsite at the place of business and available for potential acquisition by the website visitor; and (b) a live video button that is substantially adjacent to the available consumer good listing on the business website, wherein the live video button is selectively engageable by the website visitor;
a scheduling step of presenting a scheduling window to the website visitor, via the standard web browsing application, after the website visitor has selectively engaged the live video button; wherein the scheduling window enables the website visitor to select a predetermined video chat time;
a business sales application providing step of providing a dedicated consumer goods sales application running on the salesperson's networking electronic device;
an alert step of presenting an alert notification to the salesperson, via the dedicated consumer goods sales application, after the website visitor has selected the predetermined video chat time;
a video chat step of providing:
(i) a visitor video chat window that, starting substantially at the predetermined video chat time, presents live audio and video from the place of business, via the dedicated consumer goods sales application running on the salesperson's networking electronic device, substantially in real-time, to the website visitor via the standard web browsing application; wherein the live audio and video from the place of business comprises live audio and video of the desired consumer good; and
(ii) a salesperson video chat window that, starting substantially at the predetermined video chat time, presents live communication from the website visitor, via the standard web browsing application, substantially in real-time, to the salesperson via the dedicated consumer goods sales application;

a business storage step of providing a business storage subsystem that is remote from the website visitor;

a session recording step of providing a session recording of the live audio and video from the place of business and the communication from the website visitor; wherein the session recording is securely stored by the business storage subsystem;

a hang-up step of providing a hang-up button that is presented to the website visitor via the standard web browsing application and to the salesperson via the dedicated consumer goods sales application, and is selectively engageable to close the visitor video chat window and the salesperson video chat window; and a video download step of providing a video download window that is presented to the website visitor, via the standard web browsing application, after selective engagement of the hang-up button; wherein the video download window enables the website visitor to selectively download and store a copy of the session recording to the visitor's networking electronic device.

16. The method according to claim 15, further comprising a communication step of providing one or more communication buttons that are presented via the standard web browsing application, and are selectively engageable by the website visitor to present, as said live communication, one or more of the following inputs as received by the visitor's networking electronic device: text only; voice only; and voice and video together.

17. The method according to claim 15, further comprising a timer step of providing a timer window that is presented via the standard web browsing application after the website visitor has selected the predetermined video chat time, and counts-down any time remaining until the predetermined video chat time; and wherein, during the timer step, the business website enables the website visitor to continue otherwise using the standard web browsing application until the predetermined video chat time.

18. The method according to claim 15, wherein in the video download step, the video download window requires entry of a personal name and an email address/SMS number for the website visitor before delivering, to the email address/SMS number, a download link that enables the website visitor to, as aforesaid, selectively download and store a copy of the session recording to the visitor's networking electronic device; and wherein in the business storage step, the business storage subsystem stores the personal name and the email address/SMS number and provides the personal name and the email address/SMS number to the salesperson and the place of business.

19. The method according to claim 15, further adapted for use by a number of other salespeople at the place of business and at other business places and for use with a current volume of website traffic, and further comprising:

a log-in step of providing a log-in window that enables the salesperson to log-in to the dedicated consumer goods sales application after arriving at the place of business;

a business queuing step of providing a business queue of the other salespeople at the place of business and at any said other business places who have logged-in to the dedicated consumer goods sales application, with the business queue being stored in the business storage subsystem;

a business processing step of using a business processor to calculate: a position of the salesperson in the business queue based on when the salesperson logged-in to the dedicated consumer goods sales application; and, based on the position of the salesperson in the business queue and on the current volume of website traffic, an estimated time until the salesperson will be presented with the alert notification as aforesaid; and a time estimate notification step of providing a time estimate notification that is presented to the salesperson, via the dedicated consumer goods sales application, after the salesperson has logged-in as aforesaid; wherein the time estimate notification comprises the estimated time and the position of the salesperson in the business queue.

20. The method of claim 15, further comprising a business administration step of providing a business administrator interface that enables the place of business to monitor, review, and manage all information and activity related to the business website, the website visitor, the listings on the business website, the available consumer good listing, the dedicated consumer goods sales application, the salesperson, the live audio and video from the place of business, the live communication from the website visitor, the business storage subsystem, and the session recording, for quality control and training purposes.

* * * * *